(12) United States Patent
Levin et al.

(10) Patent No.: US 12,290,037 B2
(45) Date of Patent: May 6, 2025

(54) VERTICAL GARDEN WITH NESTABLE, LEAKPROOF DESIGN

(71) Applicant: Lettuce Grow by TFP, LLC, Marina Del Rey, CA (US)

(72) Inventors: Corey Levin, Austin, TX (US); Peter Kaltenbach, Austin, TX (US); Pip Tompkin, Sherman Oaks, CA (US); Jacob Pechenik, Los Angeles, CA (US)

(73) Assignee: Lettuce Grow by TFP, LLC, Marina Del Rey, CA (US)

( * ) Notice: Subject to any disclaimer, the term of this patent is extended or adjusted under 35 U.S.C. 154(b) by 219 days.

(21) Appl. No.: 17/740,542

(22) Filed: May 10, 2022

(65) Prior Publication Data

US 2023/0363325 A1  Nov. 16, 2023

(51) Int. Cl.
*A01G 9/02* (2018.01)
(52) U.S. Cl.
CPC ..................... *A01G 9/023* (2013.01)
(58) Field of Classification Search
CPC ............ A01G 9/023; A01G 2009/003
See application file for complete search history.

(56) References Cited

U.S. PATENT DOCUMENTS

| | | | |
|---|---|---|---|
| 4,736,543 A | | 4/1988 | von Bertrab Erdmann |
| 5,852,896 A * | 12/1998 | Flasch, Jr. ............... | A01G 27/02 47/79 |
| 6,612,073 B1 * | 9/2003 | Powell .................... | A01G 9/023 47/65.5 |
| 6,907,693 B1 * | 6/2005 | Bemben ................... | A01G 9/00 47/65 |
| 9,974,243 B2 * | 5/2018 | Martin .................... | A01G 9/246 |
| 10,772,270 B2 * | 9/2020 | Linneberg ............... | A01G 9/022 |
| 10,842,084 B2 * | 11/2020 | Brusatore ............... | A01G 9/249 |
| 11,464,349 B2 * | 10/2022 | Vienne ................... | A47G 7/041 |
| 2012/0281413 A1 * | 11/2012 | Lewis .................... | A01G 9/249 362/249.11 |
| 2017/0354096 A1 | 12/2017 | Xing | |

OTHER PUBLICATIONS

International Search Report and Written Opinion mailed Oct. 27, 2023, for International Patent Application No. PCT/US2023/021467.

* cited by examiner

*Primary Examiner* — Brady W Frazier
*Assistant Examiner* — Katherine Anne Kloecker
(74) *Attorney, Agent, or Firm* — Renner, Otto, Boisselle & Sklar, LLP

(57) ABSTRACT

A vertical garden having an assemblage of parts that facilitates packaging and transportation in a disassembled state and/or one or more features that provide an enhanced leakproof design. The assemblage includes a base and planter modules that are stackable atop the base to form a vertical column of stacked modules for growing plants when in a fully-assembled state. The planter modules may be nestable within each other to form a compact bundle of nested modules that is smaller in size than the vertical column of stacked modules when in a disassembled state, thereby providing a kit that facilitates compact packaging of the vertical garden. An intermediate portion of the garden may have a divider that separates a drain path from the fill port of the device, thereby restricting leakage. A catch basin may be provided for capturing debris. A modular grow lighting system also may be provided.

26 Claims, 20 Drawing Sheets

VERTICAL GARDEN WITH NESTABLE, LEAKPROOF DESIGN

TECHNICAL FIELD

The present invention relates generally to a vertical garden, and more particularly to a vertical garden having a nestable design for facilitating packaging and transportation of the vertical garden in a disassembled state and/or having one or more features that provide an enhanced leakproof design.

BACKGROUND

Vertical gardens conventionally include a lower reservoir for holding nutrient rich fluid, a planting column above the reservoir for cultivating and holding plants, and a fluid delivery system running through the column for delivering the fluid from the reservoir to the column for feeding the plants. The fluid is typically pumped to a top of the column where the fluid then drains through the column and is recycled continuously or according to a timing mechanism that controls the pumping action.

SUMMARY

Conventionally, some vertical garden designs can be relatively tall structures, with a total height of the column reaching upwards of six feet (1.8 meters) or more. This presents issues for packaging and shipping such a large structure since, even with a segmented column design, each component takes up a significant amount of space in the shipping container.

An aspect of the present disclosure addresses at least this problem by providing a base of the vertical garden in the form of a container that is sized to nest at least the vertical column of the garden within the container when in a disassembled state.

Another aspect of the present disclosure addresses at least the foregoing problem of conventional designs by providing a plurality of planter modules that are nestable within each other to form a compact bundle of nested modules when the garden is in a disassembled state, thereby facilitating packaging and shipping; and the planter modules are stackable atop each other to form the vertical planter column when the garden is in its fully-assembled state.

In exemplary embodiments, the body forming each planter module may be able to be disassembled or deconstructed to provide suitable nesting functionality, and is able to be reassembled or reconstructed to provide suitable stacking functionality.

In exemplary embodiments, the planter modules may be configured such that when nested together they can fit completely within a container base of the vertical garden. All other components of the vertical garden also may fit within the base.

The vertical garden also may include modular lighting assemblies, which may have a configuration that further facilitates packaging when in a disassembled state, while also providing suitable light coverage for plants when fully-assembled and in use.

Generally, according to aspect, a vertical garden assemblage includes a base forming a container, and at least one planter module that is stackable atop the base to form a vertical column of the vertical garden when in an assembled state, wherein the container is sized to nest at least the at least one planter module within the container when in a disassembled state.

According to another aspect, a vertical garden assemblage includes: a base and a plurality of planter modules; wherein the plurality of planter modules are stackable atop each other to form a vertical column of stacked modules that is at least partially supported by the base and configured to grow one or more plants when the vertical garden is in a fully-assembled state; and wherein the plurality of planter modules are nestable within each other to form a compact bundle of nested modules that is smaller in size than the vertical column of stacked modules to thereby facilitate packaging of the vertical garden when in a disassembled state.

According to another aspect, a vertical garden assembly includes: the vertical garden assemblage according to the foregoing in the fully-assembled state, wherein: the base provides a tank for storing feed liquid, the tank contains a pump, and a fluid conduit extends upright from the pump through the plurality of planter modules to pump the feed liquid from the pump to an upper one of the planter modules, and each of the planter modules includes: (i) a lower body part having one or more openings that open toward an internal chamber of the planter module, in which the one or more openings are configured to support the one or more plants, and (ii) an upper body part having one or more liquid flow passages that form a drainage path through the vertical column from the upper one of the planter modules to the tank, the one or more liquid flow passages of the upper body part being configured to distribute feed liquid to the one or more plants supported in the one or more openings.

According to another aspect, a kit for a vertical garden includes: the vertical garden assemblage according to any of the foregoing in the disassembled state wherein the at least one planter module is nested within and completely enclosed within the container.

In exemplary embodiments, the at least one planter module includes a plurality of planter modules, and each planter module of the plurality of planter modules has a segmented body including a first segment and a second segment, wherein the first and second segments of each planter module are decoupled from each other and are (i) nested within each other in the compact bundle, or (ii) the first segments are nested within corresponding other ones of the first segments in the compact bundle and the second segments are nested within corresponding other ones of the second segments in the compact bundle; and the compact bundle of nested modules is completely enclosed within the container.

According to another aspect, a method of assembling a kit for a vertical garden includes: providing the assemblage according to foregoing; nesting the plurality of modules together either in a constructed state or a deconstructed state to form the compact bundle of nested modules; packaging the compact bundle of nested modules into the container, in which the container at least partially forms a tank for containing liquid for the vertical garden, the packaging being such that the compact bundle of nested modules is inserted through an opening in the container and the container completely encloses the compact bundle of nested modules; and assembling a cap to the container to close the opening of the container.

Another persistent problem with conventional vertical gardens is that of water leakage external of the vertical garden, which is particularly problematic when used indoors.

An aspect of the present disclosure provides one or more structural features of the vertical garden that enhances a leakproof design.

For example, according to an aspect, a vertical garden includes: a base with a tank for containing a liquid; a planter column supported above the base for growing one or more plants, the planter column having at least one drainage flow path configured to pass drainage liquid downwardly through the planter column toward the base, the at least one drainage flow path being fluidly connected to the tank for passing the drainage liquid from the planter column to the tank; a fill port fluidly connected to the tank for filling the tank with liquid; and a divider configured to fluidly separate the drainage liquid from the fill port to thereby restrict leakage of the drainage liquid outwardly through the fill port.

Such a design enables the tank to be refilled without interrupting drainage and/or feeding of the plants.

Still a further problem that can occur with vertical gardens is that of the pump operation being interrupted by plant debris.

According to another aspect, a vertical garden includes: a base with a tank for containing a liquid; a planter column supported above the base for growing one or more plants, the planter column having at least one drainage passage configured to pass drainage liquid downwardly through the planter column toward the base, and a catch basin at an intermediate portion of the vertical garden between the planter column and the tank, the catch basin being configured to receive drainage liquid from the planter column, catch debris in the drainage liquid, and pass the drainage liquid to the tank.

Yet another problem with conventional vertical garden designs is that of lighting assemblies not interrupting the growth of plants or access to the plants while also providing suitable light coverage to the plants.

According to another aspect, a vertical garden includes: a base; a vertical planter column supported above the base for supporting and growing one or more plants; and a lighting assembly mounted to the vertical planter column; wherein the lighting assembly includes a plurality of light posts operatively mounted to and radiating from the vertical planter column, and a lighting arrangement including a plurality of light sources is provided on each light post, wherein the respective lighting arrangements on adjacent light posts are discontinuous from each other and spaced apart from each other at least in a circumferential direction around the vertical planter column, thereby facilitating plant growth and/or access to plants between the adjacent light posts and corresponding lighting arrangements.

In exemplary embodiments, each lighting arrangement of the respective light posts includes a plurality of branches extending outwardly from the post; more particularly, wherein the branches extend from the post in a Y-shape, T-shape, ring or lollipop-shape configuration, or the like.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects according to the present disclosure have particular application to vertical gardens, which may be suitable for indoor or outdoor use, and which may be used for growing and cultivating plants, such as flowers, vegetables, fruits, herbs, or the like. The vertical garden may be a self-watering, self-fertilizing hydroponic garden, with a plurality of stackable planter modules that provide a modular design. The principles and aspects according to the present disclosure may have suitability for other gardening systems or for other applications where desirable.

Figure 1:
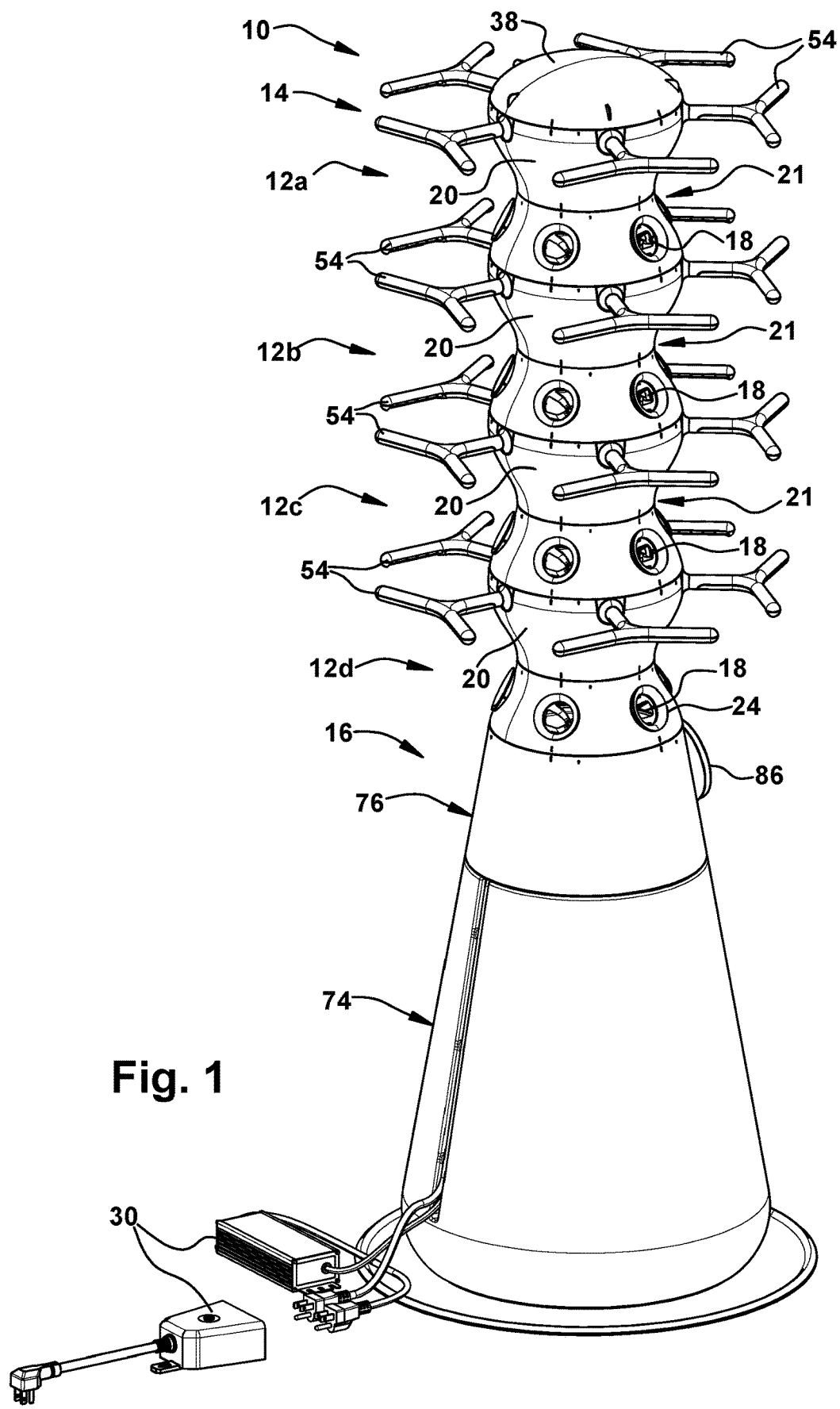
FIG. 1 is a perspective view of an exemplary vertical garden according to an embodiment of the present disclosure, which is shown in an exemplary fully-assembled state with a plurality of planter modules stacked atop each other above a base.
Figure 2:
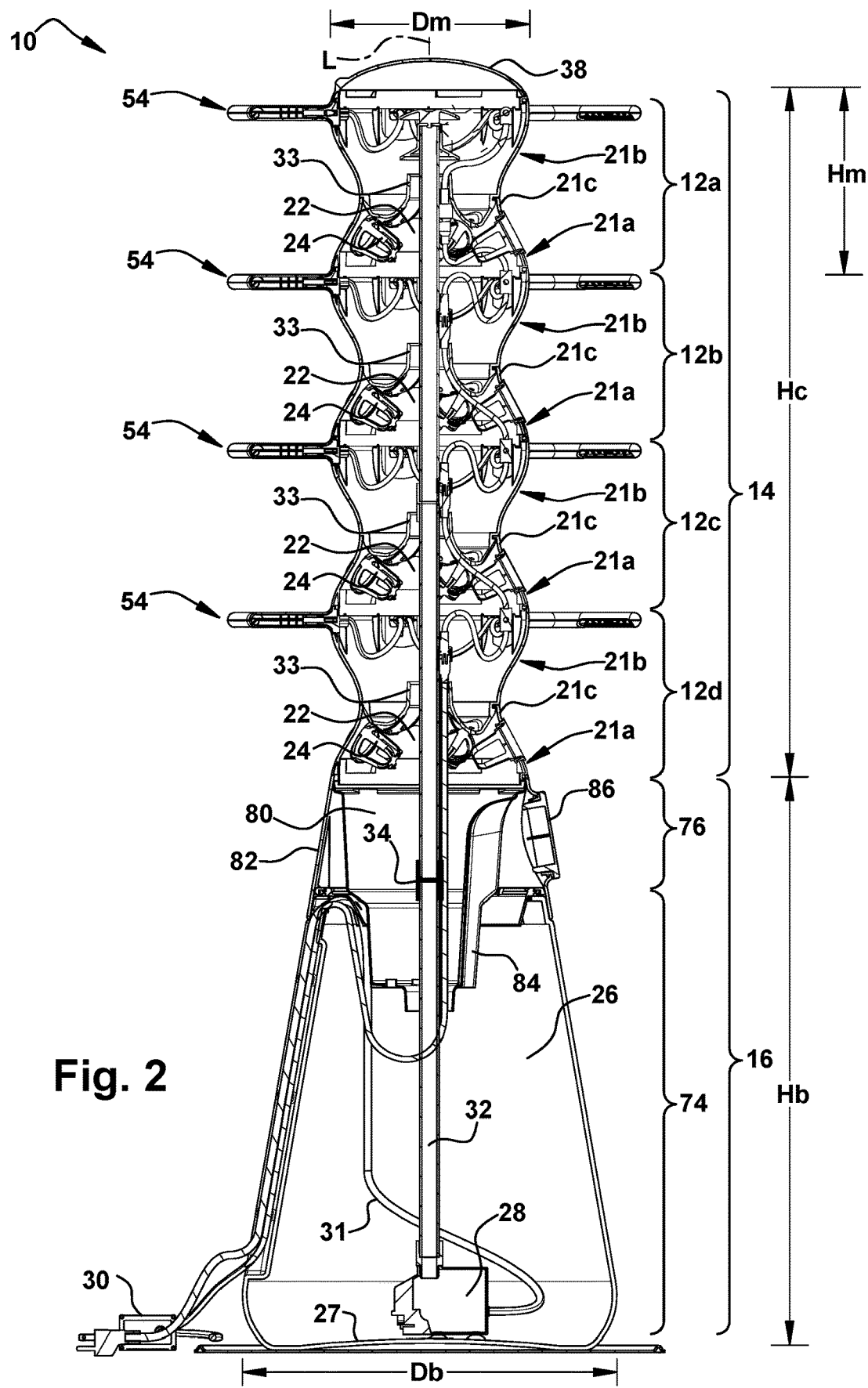
FIG. 2 is a cross-sectional side view of the vertical garden in FIG. 1.
Figure 3:
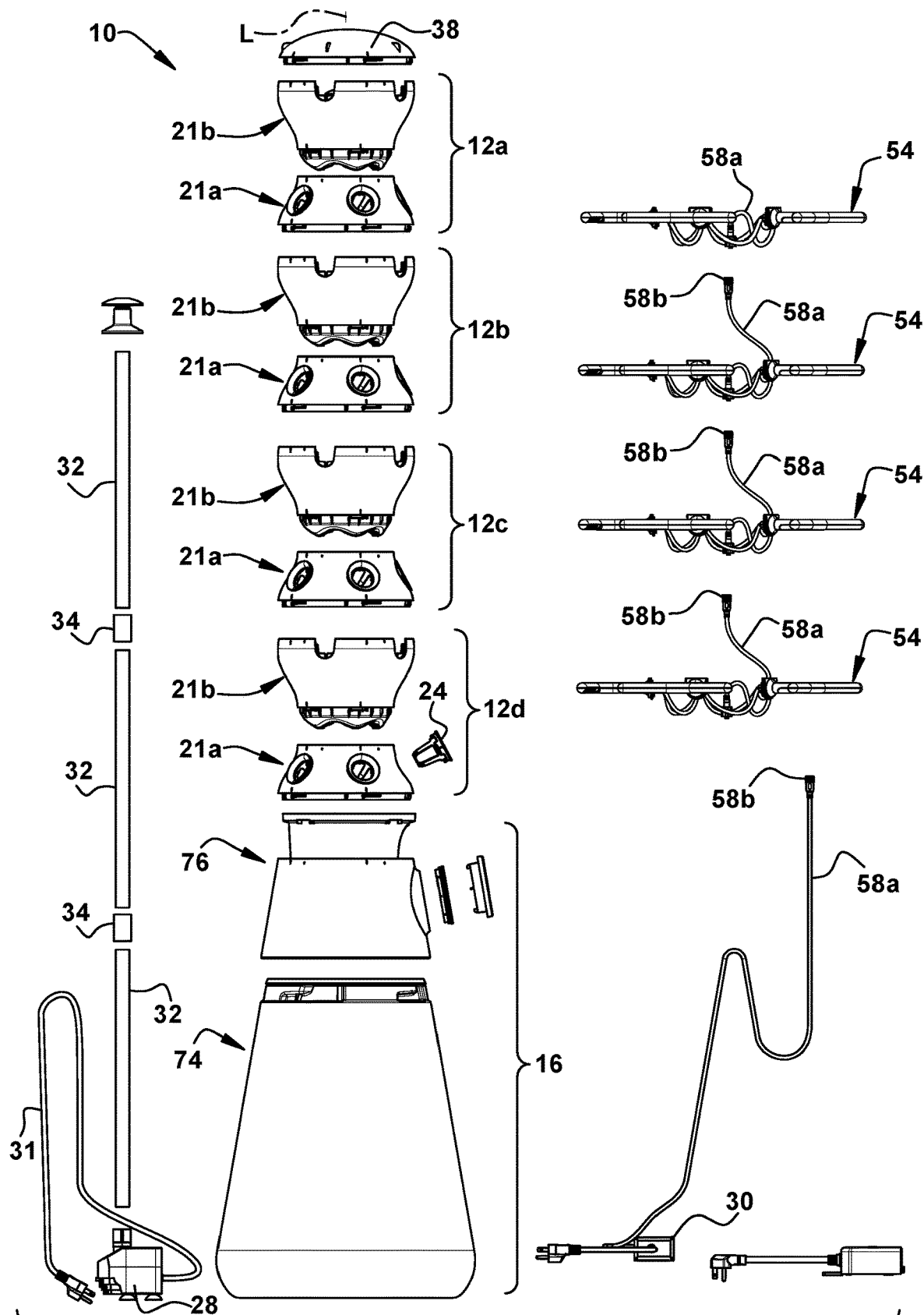
FIG. 3 is an exploded side view of the vertical garden in FIG. 1.

Referring to FIGS. 1-3, an exemplary vertical garden 10 is shown. The vertical garden 10 includes a plurality of planter modules 12a, 12b, 12c, 12d, etc. that are stackable atop each other in a vertical direction along a common vertical axis L to form at least one vertical planter column 14. The planter column 14 is at least partially supported by a base 16 that is configured to rest on a horizontal surface. As shown, each of the planter modules (also collectively or individually referred to with reference 12) may be identical in shape and size such that the planter modules 12 may be easily added or removed to decrease or increase the profile of the vertical garden 10. Although only one vertical planter column 14 is shown, the modules 12 may be constructed to form multiple columns along multiple axes and may be of any shape or form. Any number of planter modules 12 may be provided, for example, between one and six planter modules, or more.

Figure 4:
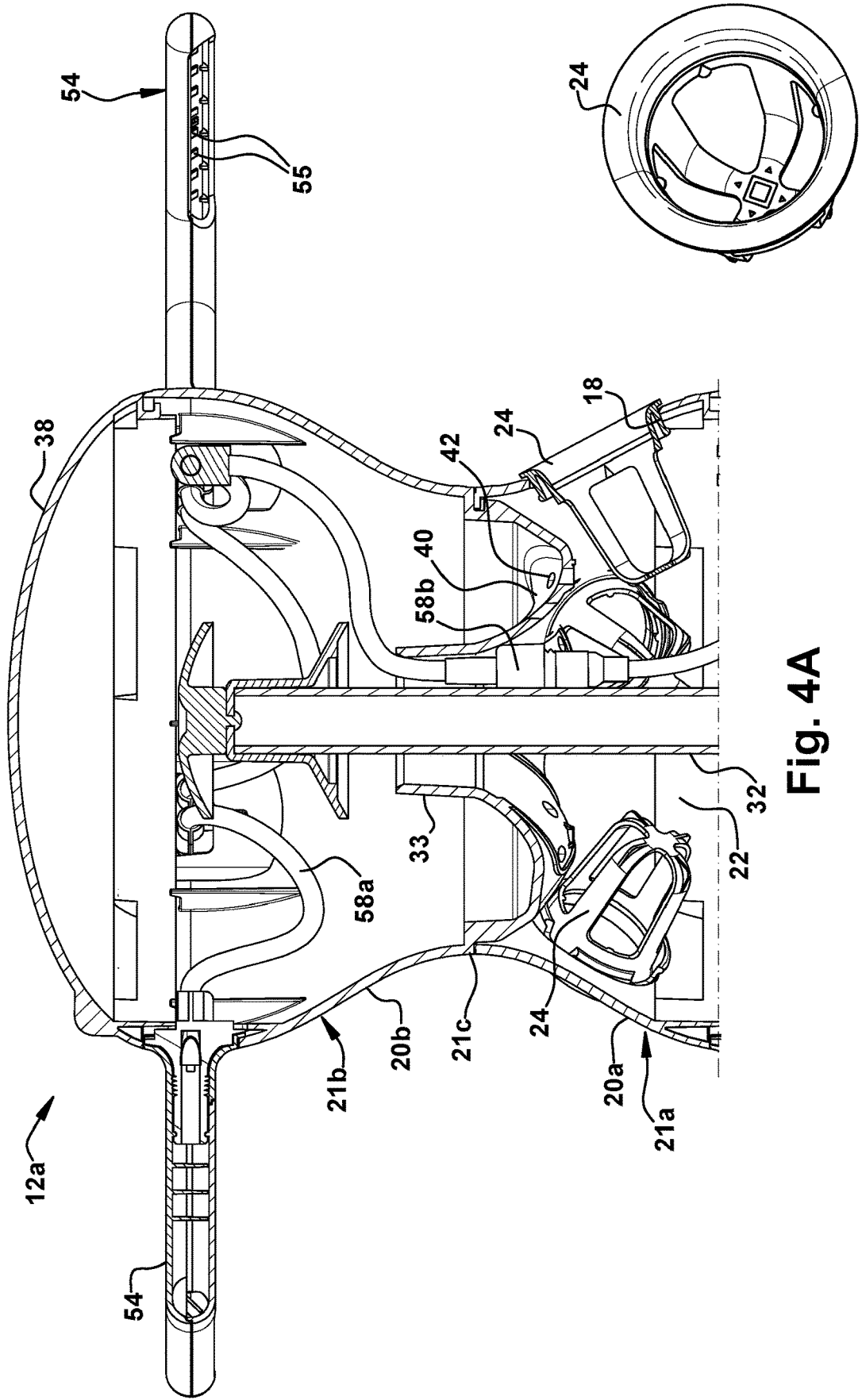
FIG. 4A is a cross-sectional side view of an uppermost planter module of the vertical garden in FIG. 2.
FIG. 4B is an enlarged perspective view of a container of the planter module in FIG. 4A.

As shown in the illustrated embodiment, each planter module 12 may include a plurality of recesses or openings 18 formed in an outer surface 20 of the planter module 12. The module 12 includes a body 21 that forms a housing with at least one internal chamber 22, and the openings 18 may open to the internal chamber 22 of the module, as shown, or may open into a recessed cavity, which may be in the form of an integral basket, screen or net disposed in the internal chamber 22. The openings 18 are configured to receive and support a container 24, such as a pod or cup, which can contain a seedling and/or roots of any suitable plant to be grown. As shown, the openings 18 may be evenly spaced circumferentially about the module 12 and the openings 18 may have an ordered arrangement. The containers 24 (e.g., pod-like cups) may be insertable and removable from the openings 18, and each cup may include a message, such as an inspirational message, as shown in FIG. 4B, for example. The containers 24 also may contain an indicator for proper orientation relative to the module housing.

Referring to FIG. 4A, the uppermost planter module 12a is shown in cross-section. As shown, one or more of the outer surfaces 20 of the planter module may be angled relative to the common vertical axis L. For example, the planter modules 12 may be formed such that an outer diameter of the planter modules 12 varies along a height (Hm) of each planter module. In exemplary embodiments, the openings 18 may be formed in a lower body portion 21a (or part) of the planter module having an outer surface 20a that tapers or curves radially outwardly in a downward direction. An upper body portion 21b (or part) of the planter module may have an outer surface 20b that tapers or curves radially inwardly in a downward direction, such that an intermediate vertical section 21c of the planter module 12 has the smallest diameter of the planter module. In this manner, the upper body portion 21b and the lower body portion 21a each have radially enlarged portions that taper or curve toward radially narrowed portions, which forms a generally frustoconical, hemispherical, or other bowl shape to each body portion, and provides a generally hourglass shape to each planter module 12, as shown.

In the illustrated embodiment, the outer surface 20a of the lower body portion 21a forms an angled support for the plants in which the openings 18 and the containers 24 in the lower body portion 21a are angled upwardly for holding the plant (or pod having the plant roots) generally upright. The upper body portion 21b of each module, which tapers radially inwardly toward the lower body portion 21a of the module, forms a liquid distribution well (e.g., drainage well or funnel) for supplying liquid to the plants supported by the lower body portion 21a, as described in further detail below. It is of course understood that the modules can be constructed oppositely with the lower portions forming the liquid distribution portion and the upper portion forming a holding portion, or partial modules with one or the other of the holding portion or liquid distribution portion may be provided. In addition, other dimensions and shapes for the planter modules may be suitable.

Turning back to FIGS. 1-3, the base 16 of the vertical garden 10 supports the column 14 of planter modules and includes a reservoir or tank 26 for containing a fluid, such as a nutrient-enriched liquid (e.g., water), that is used to feed the plants. The base 16 may have a tapered or generally conical configuration such that it tapers radially inwardly in an upward direction. In this manner, a bottom surface 27 of the base has a larger surface area as compared with a top portion of the base. The base 16 may have a height (Hb) and outermost diameter (Db) that are greater than a height (Hm) and outermost diameter (Dm) of the individual planter modules 12. This provides a relatively large tank 26 that can supply each module 12 with a sufficient amount of liquid, and also facilitates packaging and shipping of the disassembled unit, as described in further detail below. Many other dimensions and shapes of the base 16 and/or tank 26 may be suitable, such as a more cylindrical form.

Referring particularly to the cross-sectional view of FIG. 2, the tank 26 of the base 16 encloses a water pump 28. The water pump 28 may rest on the bottom surface 27 of the tank 26 so that it is submerged in the feed liquid. The pump 28 is connected to a power source 30 via an electrical line 31 that may extend outside of the tank 26. The pump 28 is configured to supply the feed liquid (e.g., water) to a fluid conduit 32, such as a rigid tubular pipe, which extends upwardly from the water pump 28 along the common vertical axis L and through each of the planter modules 12 in the planter column 14. As shown, an internal hub 33 of each planter module 12 is configured to radially surround the conduit 32, which may be inserted through respective hub openings during assembly. The internal hub 33 also may provide support and vertical alignment of the conduit 32, or individual conduit sections. As shown, suitable coupler(s) 34 may be used to co-axially couple axially adjacent sections of the conduit 32 (e.g., pipe), such that sections of the conduit 32 can be added or removed based on the number of planter modules 12 utilized in the vertical garden 10.

Figure 5:
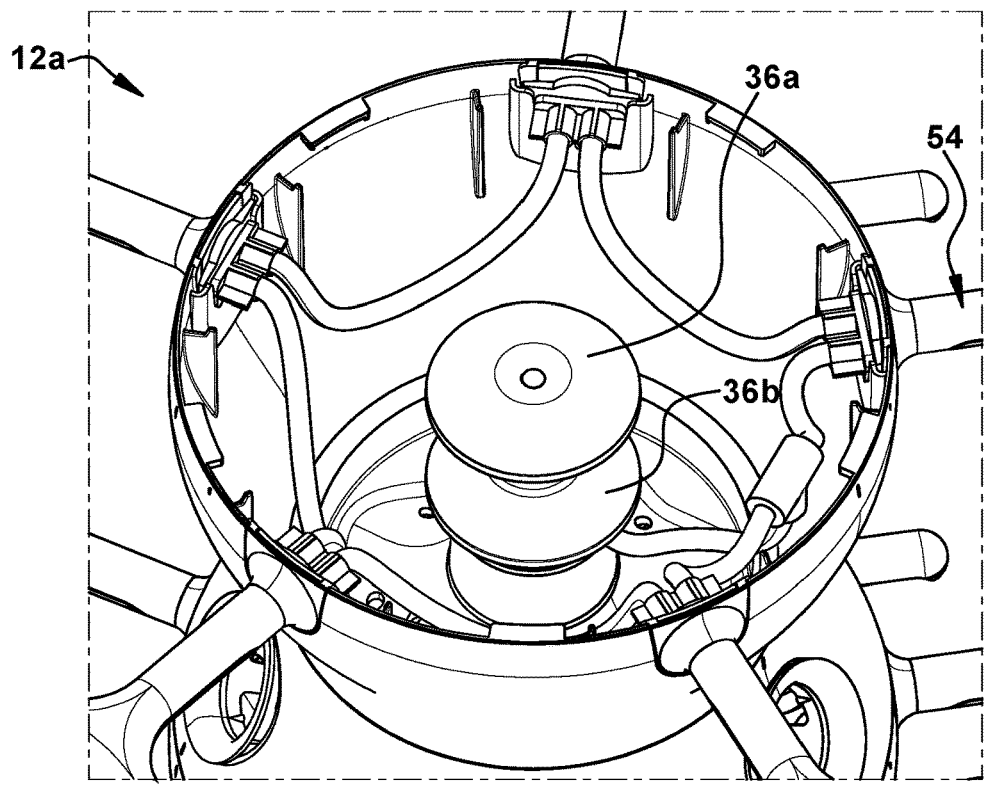
FIG. 5 is a top perspective view of the uppermost planter module of FIG. 4A with a cap removed.
Figure 6:
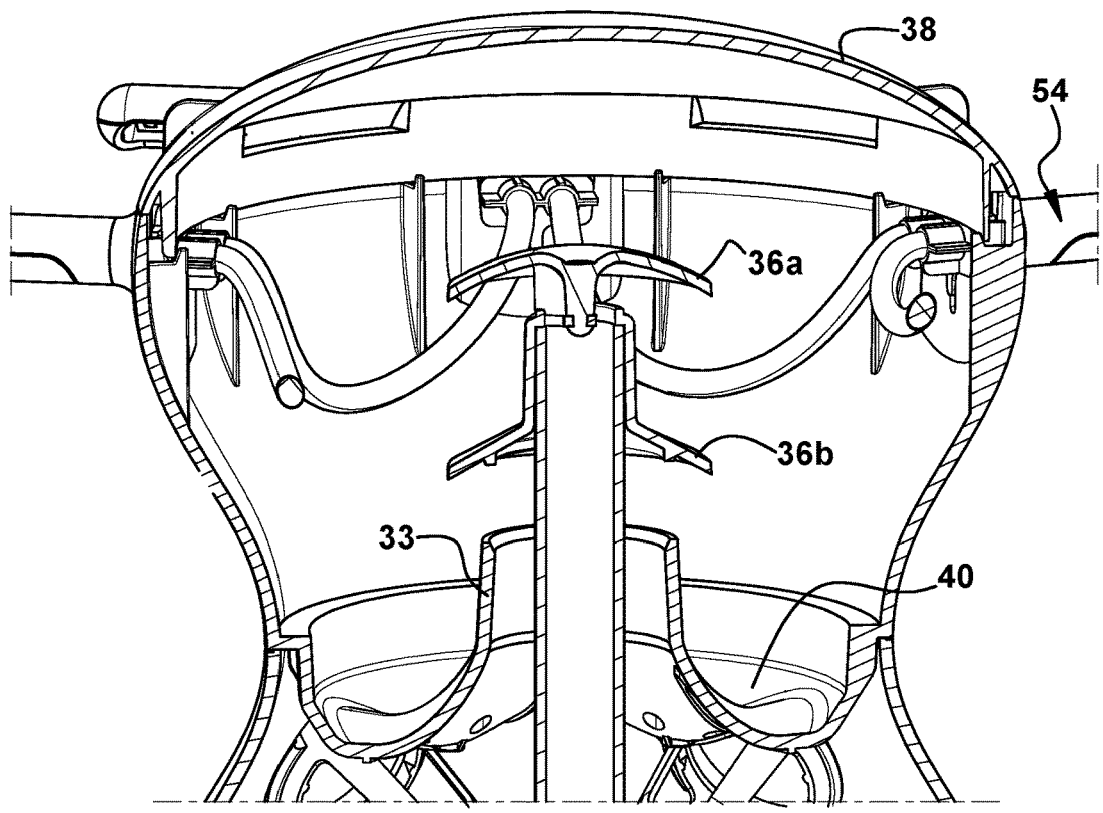
FIG. 6 is a cross-sectional top perspective view of the planter module in FIG. 5.
Figure 7A:
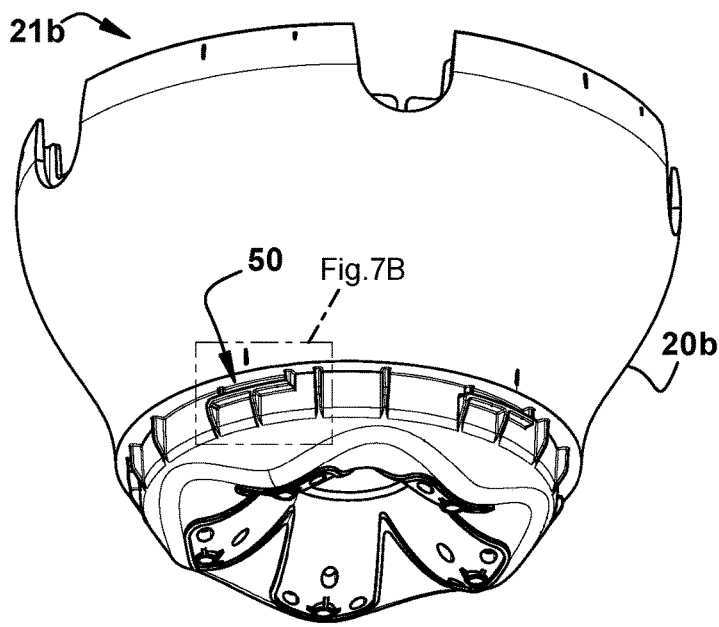
FIG. 7A is a bottom perspective view of an upper body portion of the planter module in FIG. 4A that has been decoupled from a lower body portion.
Figure 7B:
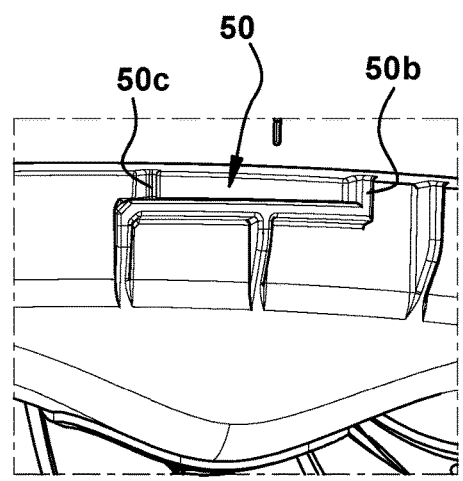
FIG. 7B is an enlarged view of the region 7B in FIG. 7A.
Figure 8B:
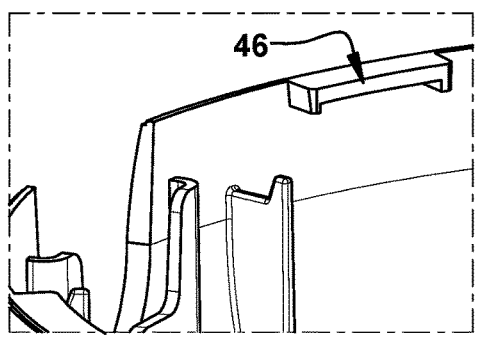
FIG. 8B is an enlarged view of the region 8B in FIG. 8A.
Figure 8A:
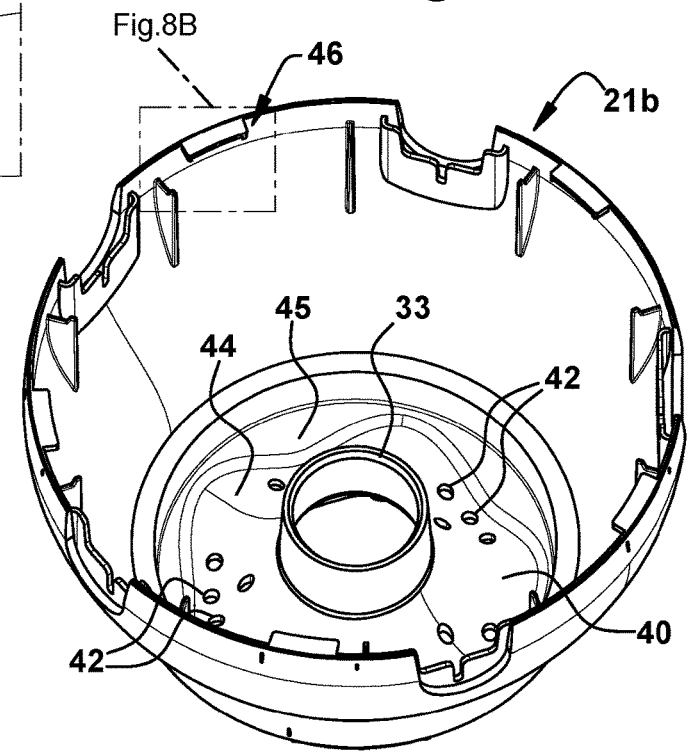
FIG. 8A is a top perspective view of the upper body portion in FIG. 7A.

The pump 28 delivers the feed liquid from the tank 26 to the uppermost planter module 12a via the conduit 32. As shown in FIGS. 5 and 6, the uppermost module 12a may include one or more diffusers 36a, 36b in the upper body portion 21b that spray the liquid from the outlet of the conduit 32. In the illustrated embodiment, an upper diffuser 36a and a lower diffuser 36b are provided. The upper diffuser 36a prevents water from escaping and directs water downwardly. The lower diffuser 36b directs water outwardly to restrict leakage through the internal hub 33. The top of the vertical garden 10 also may have a cap 38 (FIG. 4A) that covers the uppermost planter module 12a. The cap 38 contains the feed liquid to the module and prevents contamination of the feed liquid from the outside environment. The cap 38 may be utilized with any of the planter modules 12 depending on the number of modules employed.

Referring to FIGS. 7A-10B the upper body portion 21b and the lower body portion 21a of each module 12 may be separated by a divider 40, which forms a floor 40 of the upper body portion 21b. As noted above, the upper body portion 21b of each planter module forms a liquid distribution well that supplies feed liquid to the plants supported by the lower body portion 21a below. The divider 40 (or floor) of the upper body portion 21b may include a plurality of fluid passages 42 for feeding the plants supported by the lower body portion underneath. As shown in the illustrated embodiment, the fluid passages 42 may be in the form of drainage through-passages in the floor 40, which are configured to provide a liquid drainage path for the column that hydroponically gravity feeds the liquid to the roots of the plants within the internal chamber 22 of the lower body portion 21a below. The fluid passages 42 are located above the containers 24 (also referred to as cups 24) containing the seedling or plant roots in the internal chamber 22 so that the drainage liquid drips directly onto the region of the roots of each plant.

In exemplary embodiments, the floor 40 (divider) of each module 12 is sloped and/or contoured to direct the liquid toward the fluid (drainage) passages 42. In the illustrated embodiment, for example, the floor 40 is contoured with circumferentially spaced apart raised regions 44 between lower regions 45 having the fluid passages 42. The central hub 33 also is at a higher elevation than the floor 40 to restrict drainage through the central hub opening. As is apparent in the illustration, each planter module 12 in the vertical planter column 14 may contain drainage through-passages 42 so that the drainage flow path of the column 14 enables the liquid to drain from the uppermost module 12a through the lowermost module 12d and back to the tank 26 where the liquid can be recycled back to the top.

As shown, each planter module (e.g., 12b) is attachable to or detachable from one another (e.g., 12a, 12c) via suitable connection interfaces. The respective parts of the connection interfaces may include an upper connector 46 and lower connector 48, in which the lower connector 48 of the lower body portion 21a of one module 12b can be coupled with an upper connector 46 of the upper body portion 21b of an adjacent module 12c, for example. The connection interface may be an interlocking interface in which the respective connectors 46, 48 include complementary interlocking elements (also referred to with 46, 48). Any suitable interlocking interface may be used, such as threaded connectors, tongue and groove connectors, pin-slot connectors, lug-channel connectors, meshing teeth, press-fit connection, snap-fit connection, or other suitable engaging parts. The interlocking interface (including interlocking elements 46, 48) of each module 12 may be the same as each other to promote modularity of the design. The configuration of the interlocking interface of the modules 12 also may be used on other components of the vertical garden, such as the cap 38 or base 16, for example, for further enhancing the modular design regardless of the number of modules 12 in use.

Figure 10A:
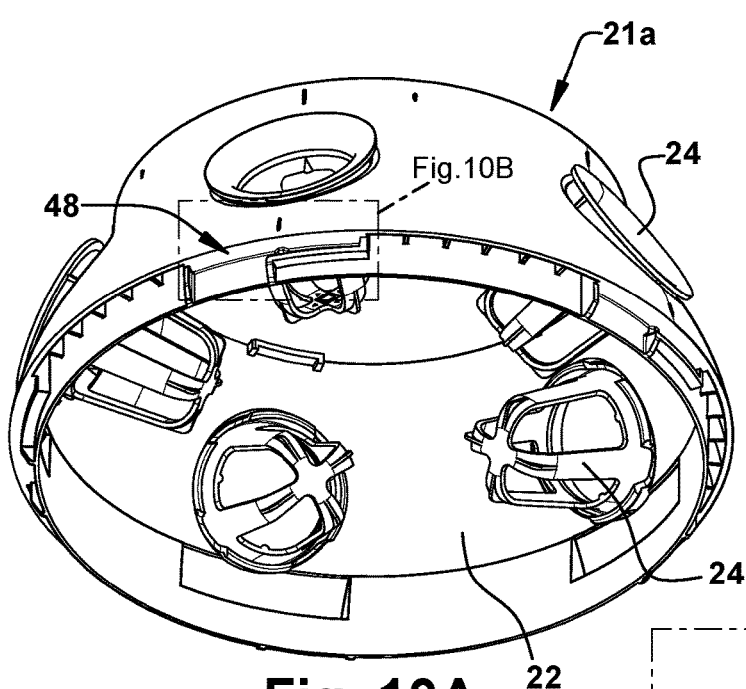
FIG. 10A is a bottom perspective view of the lower body portion in FIG. 9A.
Figure 10B:
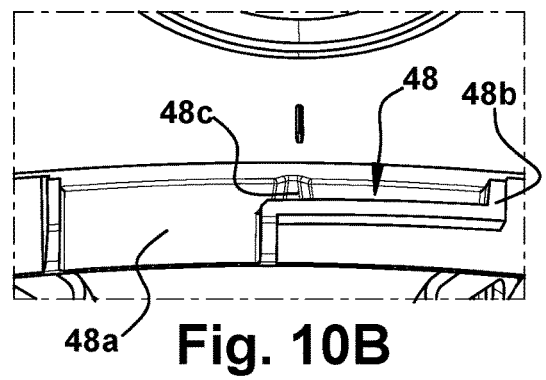
FIG. 10B is an enlarged view of the region 10B in FIG. 10A.

In the illustrated embodiment, the interlocking elements 46 of the upper body portion 21b includes circumferentially spaced apart lugs 46 (shown in FIGS. 8A and 8B, for example), and the interlocking elements 48 of the lower body portion 21a include slots 48 (shown in FIGS. 10A and 10B for example). The respective lugs 46 and slots 48 are adapted to interlockingly interface with each other in a complementary manner. As shown, the slots 48 in the lower body portion 21a may have an axially extending portion 48a and rotational stop 48b for proper orientation and alignment between the adjacent modules when interlocked together. One or more detents 48c may be provided at the interlocking interface, such as within the slot 48 (shown in FIG. 10B) to provide restriction to disassembly, such as when cultivating plants. As shown, the detent 48c may include a protruding ridge within the slot 48, although many different configurations of the detent are possible, including active or passive detent mechanisms, for example.

Still referring to FIGS. 7A-10A, each planter module itself may be segmented, such that the upper body portion 21b and the lower body portion 21a are attachable to, or detachable from, one another via a suitable intra-module connection interface. The intra-module connection interface may include connector(s) 50 of the upper body portion 21b and corresponding connector(s) 52 of the lower body portion 21a. Similarly to the interlocking interface between adjacent modules (e.g., 12a, 12b), the intra-module interlocking interface between the lower body portion and the upper body portion of the same module may have any suitable complementary interlocking members (also referenced with 50, 52) such as threaded connectors, tongue and groove connectors, pin-slot connectors, lug-channel connectors, meshing teeth, press-fit connection, snap-fit connection, or other suitable engagement parts, and the like. The intra-module interlocking interface (including interlocking elements 50, 52) of each module 12 may be the same as the other modules so that the parts are essentially location agnostic for facilitating assembly.

Figure 9A:
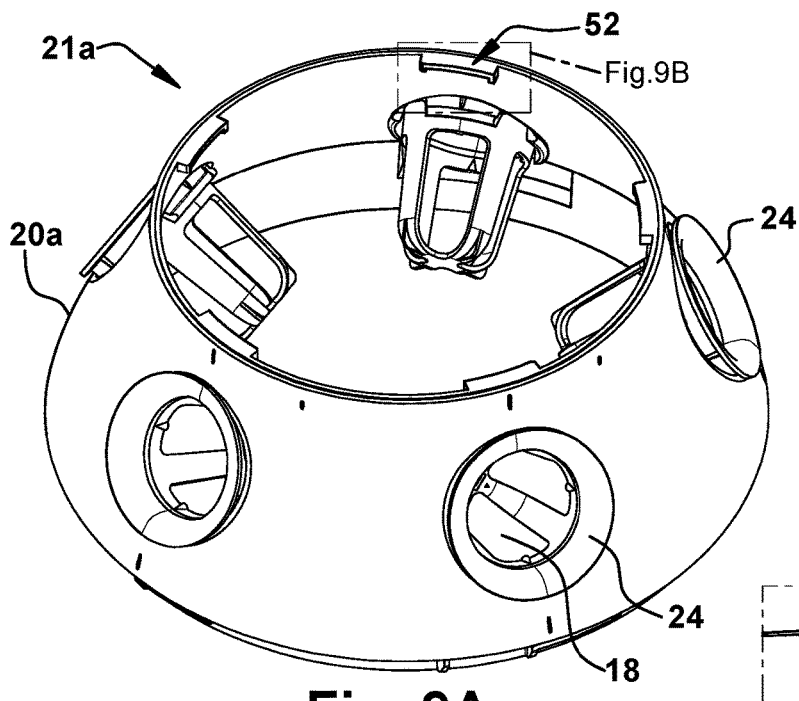
FIG. 9A is a top perspective view of a lower body portion of the planter module in FIG. 4A that has been decoupled from the upper body portion.
Figure 9B:
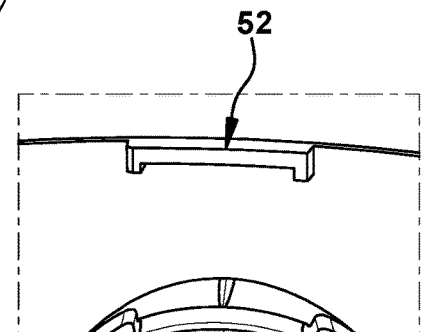
FIG. 9B is an enlarged view of the region 9B in FIG. 9A.

In the illustrated embodiment, the intra-module interlocking elements 52 of the lower body portion 21a includes circumferentially spaced apart lugs 52 (shown in FIGS. 9A and 9B, for example). The intra-module interlocking elements 50 of the upper body 21b portion includes slots 50 (shown in FIGS. 7A and 7B, for example) that are complementarily shaped to receive the lugs 52 of the lower body portion 21a. The slots 50 in the upper body portion 21b may have a rotational stop 50b and one or more detents 50c to restrict disassembly. The detent 50c may have any suitable form, including active or passive detents. In the illustrated embodiment, the detent 50c is formed as a protruding ridge. In exemplary embodiments, the detent 50c (or other suitable mechanism for unlocking resistance) may be stronger at the intra-module interlocking interface (50, 52) between the upper and lower body portions 21a, 21b (e.g., at the narrower section 21c), as compared to the interlocking interface (46, 48) between adjacent modules (e.g., 12a, 12b). This is to ensure that modules 12 come apart as a set first before deconstructing the individual module 12 for storage/shipping. Alternatively or additionally, the inter-module interlocking interface (46, 48) may be configured to unlock in a counter-rotational direction to that of the intra-module interlocking interface (50, 52) to ensure unlocking of the modular unit before module segments.

Figure 14:
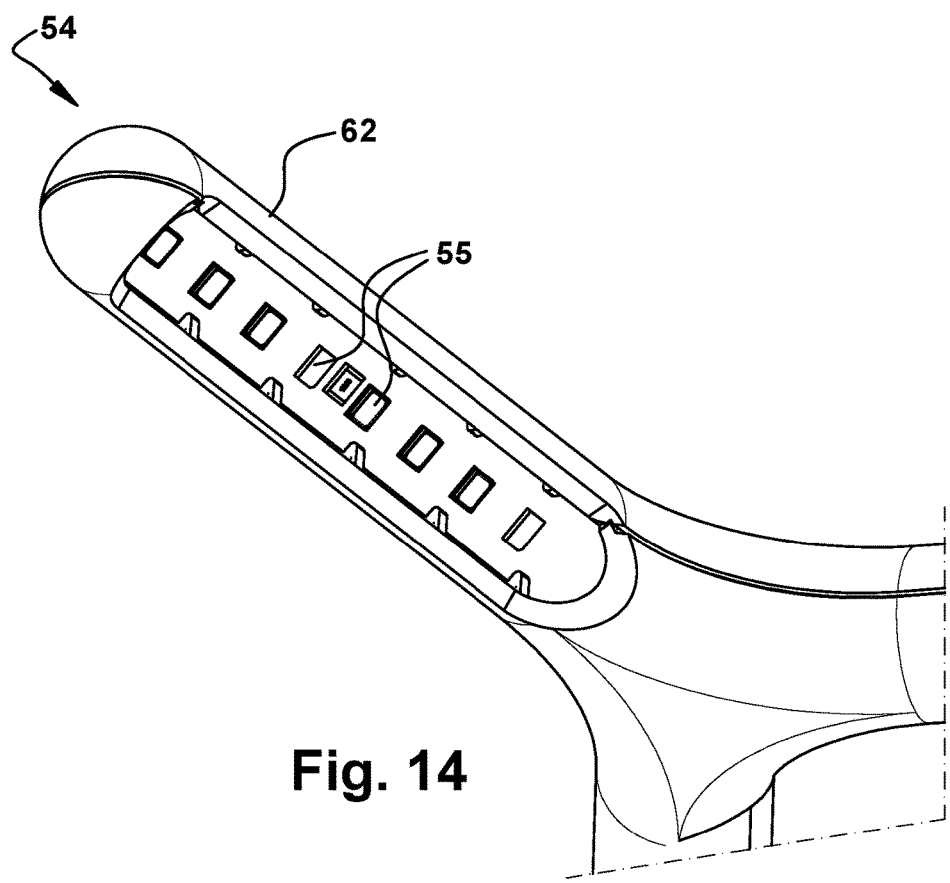
FIG. 14 shows an arrangement of light sources of one of the branches of the branch light.

Turning back to FIGS. 1-3, the vertical garden 10 may include a modular lighting system including a plurality of lights 54 for providing a source of light that promotes growth of the plants. The modular lighting system is configured to aim and direct the light toward the openings 18 of the planter modules 12, and thus the containers 24 supported in the openings 18. The lighting system may include a lighting assembly having a plurality of branched lights 54 for each module 12a, 12b, 12c, 12d, etc. (as shown), or may include a ring light that encompasses each module 12, or may have any other suitable configuration. Each branch light 54 or ring light may include a plurality of light sources 55 (FIG. 14), such as light-emitting diodes (LEDs), that are adapted for promoting plant growth. In exemplary embodiments, for example, a combination of red and white LEDs may be provided for each branch light 54, which provides a light spectrum that is efficient, aesthetically pleasing, and promotes plant growth.

The lighting system including the lights 54 is connected to a suitable power supply 30 via electrical connectors, such as wires 58a, cables, harnesses, plugs, couplers 58b, or the like. Alternatively or additionally, a power supply, such as a battery source, may be incorporated into each module. The power supply 30 may be the same power supply as for the pump 28, or may be an additional power supply. As shown, the electrical wiring 58a may extend from the base 16 to each module 12 via the internal hubs 33 of each module. The electrical connectors may be sealed or shrouded by suitable protectant(s) to prevent water reaching the electronics. For example, the electrical wires 58a may be shrouded by silicone or another material that is suitable for protecting the cables and is also safe for use with food. The electrical couplers 58b between segments of wires 58a may be sealed threaded connectors, for example. As shown, the assemblies of branched lights 54 within each module 12 may be connected in series, and the assemblies of branched lights 54 between modules 12a, 12b, etc. may be connected in parallel. Suitable control circuitry may be connected to the power supply 56, such as a timer for the pump 28 and/or lights 54, a dimmer module, an integrated power supply/timer/dimmer module, or the like.

Turning to FIGS. 11-14, each branch light 54 of the lighting system may include a radially outwardly extending spoke 60 (or post 60) that is mounted to the body of the module 12. The branch lights 54 may be provided in a lighting arrangement that is mounted to the vertical column 14 in a laterally spaced array (e.g., circumferential) and/or longitudinally spaced array (e.g., vertical), which may be an ordered or irregular spaced array. In exemplary embodiments, the light posts 60 are operatively mounted to and radiate from the vertical planter column, and a lighting arrangement including a plurality of light sources 55 is provided on each light post 60. As shown, the respective lighting arrangements on adjacent light posts 60 are discontinuous from each other and spaced apart from each other at least in a circumferential direction around the vertical planter column. This facilitates plant growth and/or access to plants between the adjacent light posts and corresponding lighting arrangements. The discrete post/light arrangements also facilitate bundling, as described in further detail below. In the illustrated embodiment, the lighting arrangement in the form of the branches 54 is evenly spaced circumferentially about the axis L, and the location of each spoke 60 generally corresponds with the location of the openings 18 holding the plants to provide adequate light coverage over each plant without light waste. The light branches 54 may be evenly spaced along the common vertical axis L such that one planter module 12 extends vertically between two vertically aligned light branches 54.

In exemplary embodiments, the light branches may provide different light output depending on their location on the vertical planter column 14. For example, the light branches 54 at the uppermost module 12a may provide greater light output than the light branches 54 at the intermediate module 12b, which may provide greater light output than the light branches 54 at the lowermost module 12d. This is because the light to lower modules may be cumulative of the upper modules, and thus not as much light output may be required at the lower modules. The difference in light output may be provided by suitable control circuitry in the lighting system.

In the illustrated embodiment, the light sources 55 (e.g., LEDs) are mounted to branch portions 62 that extend from the spoke 60 in a T-shape or Y-shape configuration. The Y- or T-shape configuration of the branch portions 62 provides suitable light coverage and also may restrict obstruction with the growth of the plants. The Y- or T-shape configuration of the branch portions 62 also may prevent obstruction in gaining access to the plants. The Y- or T-shape configuration of the branch portions 62 also may permit improved compaction when the garden is disassembled into a package, as described in further detail below. Other suitable shapes for the lights 54 are possible, such as rings or loops at the end of the spokes 60 (e.g., a lollipop-type design). Each of the light branches 54 may be identical in shape and size, although the light branches 54 may be sized differently depending on the arrangement and desired application of the planter modules.

Figure 11:
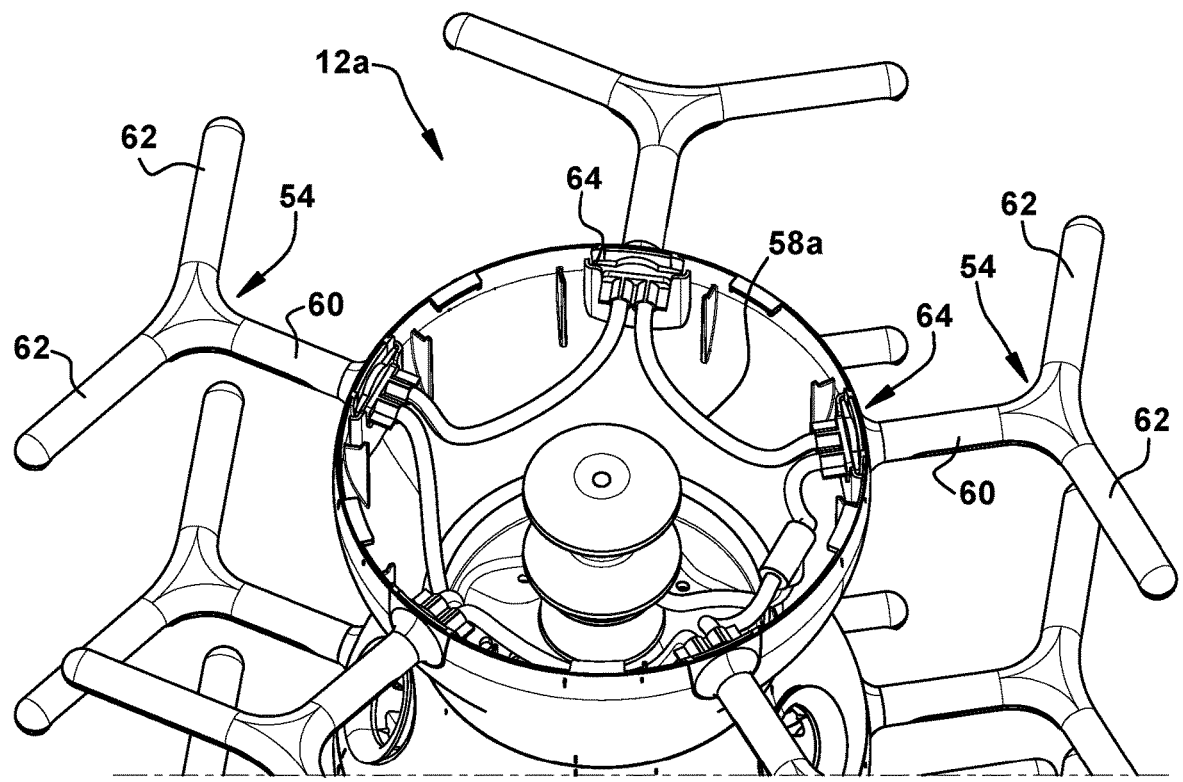
FIGS. 11 and 12 show an exemplary method of removing a modular lighting system from the uppermost planter module in FIG. 4A.
Figure 12:
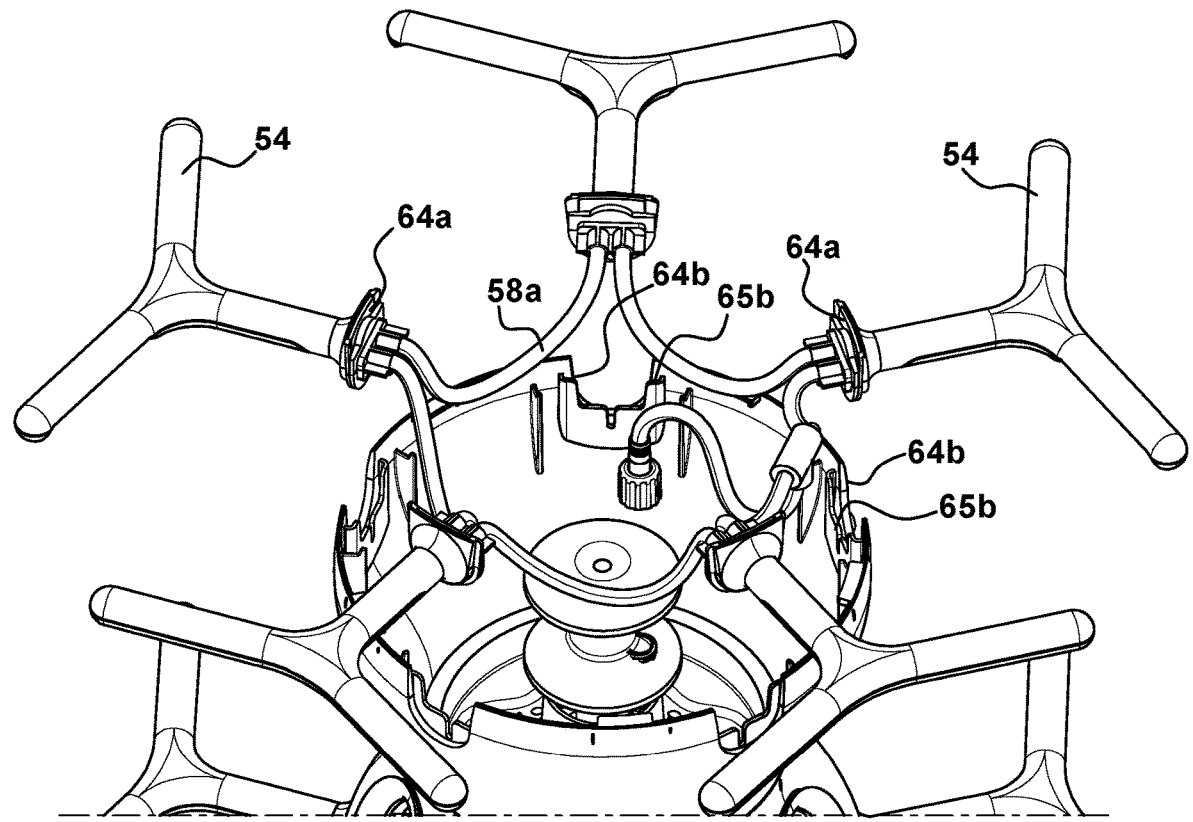
Figure 13:
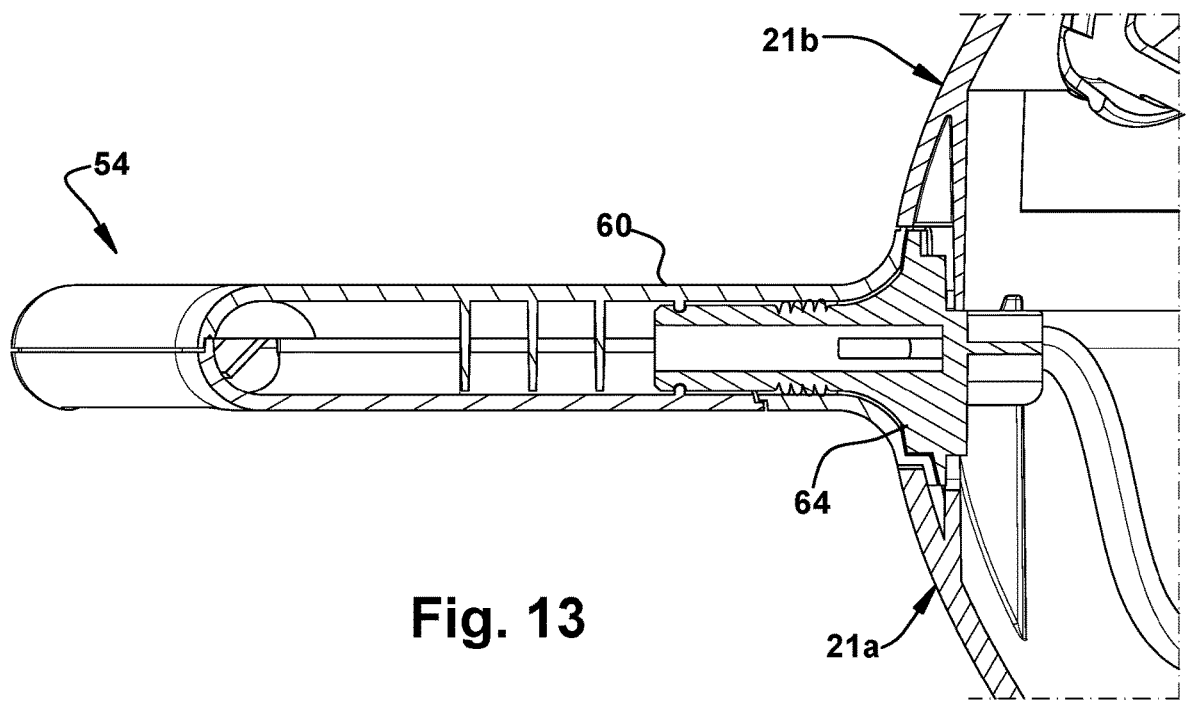
FIG. 13 is a cross-sectional view of a mounting connection of a branch light of the lighting system of the uppermost planter module.

Referring particularly to FIGS. 11 and 12, to promote modularity and compact packaging, the assembly of light branches 54 for each module 12 is mountable to, or demountable from, the upper body portion 21b via an easy to assemble or disassemble connection interface 64. For example, in the illustrated embodiment, the spokes 60 of the light branches 54 are attached to mounting brackets 64a that slide within recessed slots 64b at the upper edge of each upper body portion. A suitable interlocking connection interface 64 between the bracket 64a and upper body portion 21b, such as a slot/channel-tab or tongue-groove interface, may be used to secure each light branch 54 in place. In the illustrated embodiment, the brackets 64a are configured to be held by tabs 65b of the upper body portion 21b that project into the slots 64b, although the configuration could be reversed. The mounting brackets 64a, and thus light branches 54, also are held in place by being sandwiched by the adjacent module. In exemplary embodiments, the mounting configuration, such as with the recessed slots 64b, is such that the height (Hm) of each module 12, and thus the overall height (Hc) of the vertical column 14, does not increase in size when the light branches 54 are mounted thereto. The recessed areas (e.g., slots 64b) and corresponding mounting connectors (e.g., brackets 64a) may be generally U-shaped, as shown, or may have any other suitable shape. Each light branch 54 may be connected via a flexible electrical connector, such as via wire segments 58a, that permits flexibility and enables the entire light assembly for the module to be bunched together for compact storage, as described in further detail below.

To provide a more leakproof design, the vertical garden 10 may include one or more structures, such as water diversion features or the like, that facilitate proper water distribution throughout the garden while restricting leakage outwardly of the garden.

Figure 15:
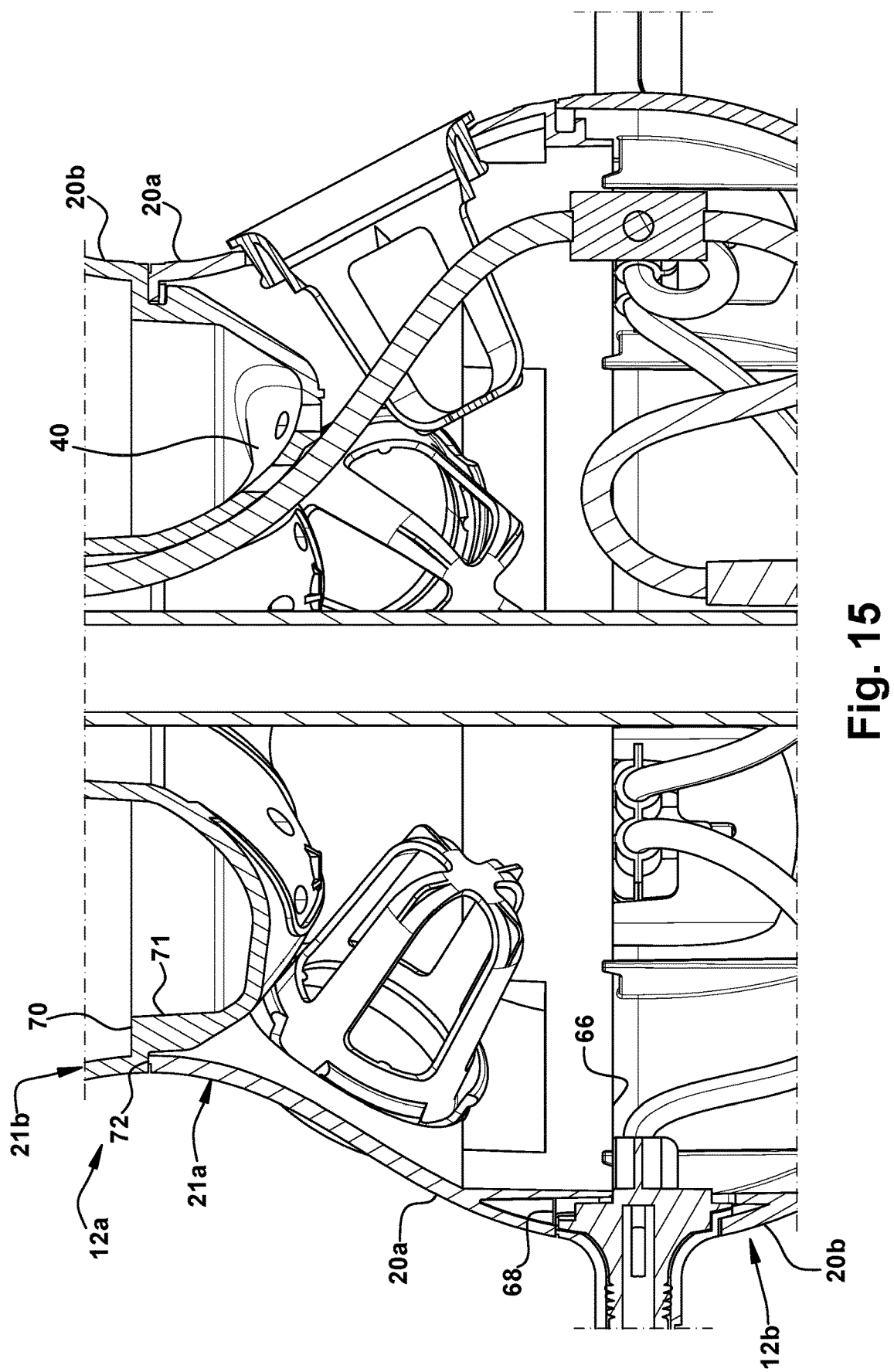
FIG. 15 is an enlarged cross-sectional side view of portion of an intermediate planter module in FIG. 2, which shows an intra-module connection between upper and lower body portions of the planter module, and an inter-module connection between the planter module and a below planter module.
Figure 16:
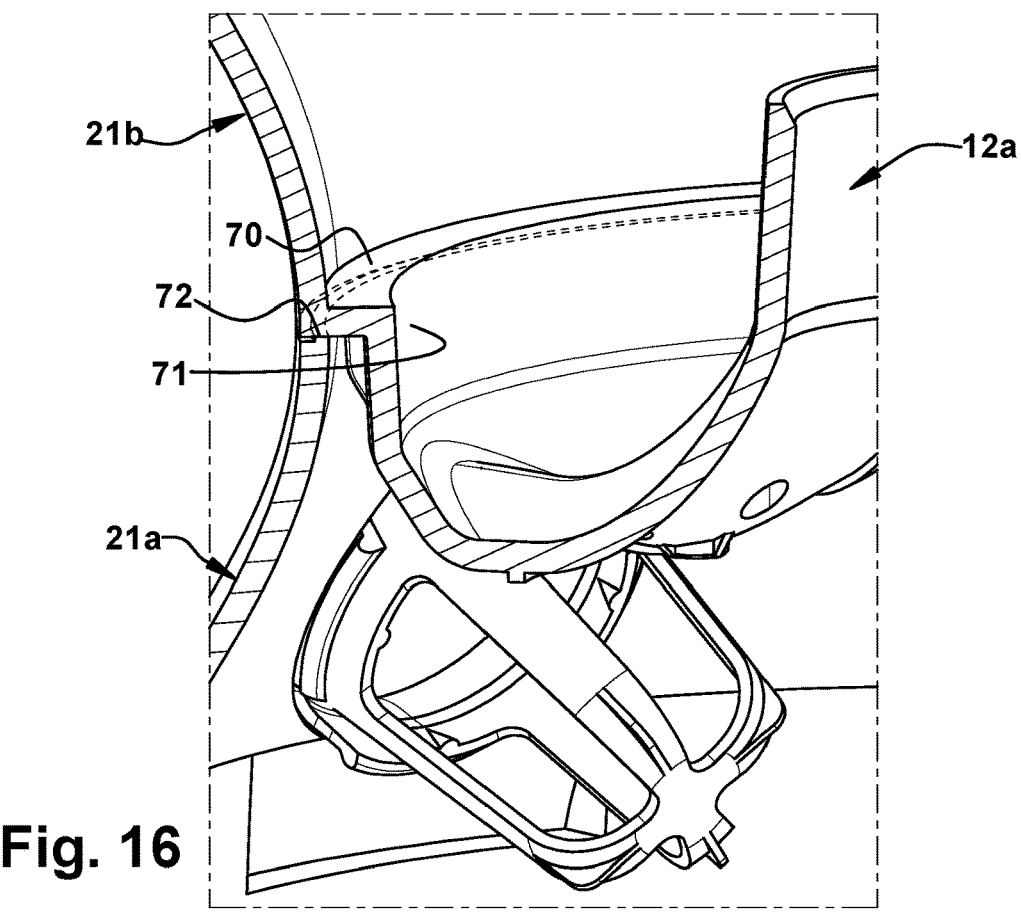
FIG. 16 is an enlarged view of the intra-module connection in FIG. 15.
Figure 17:
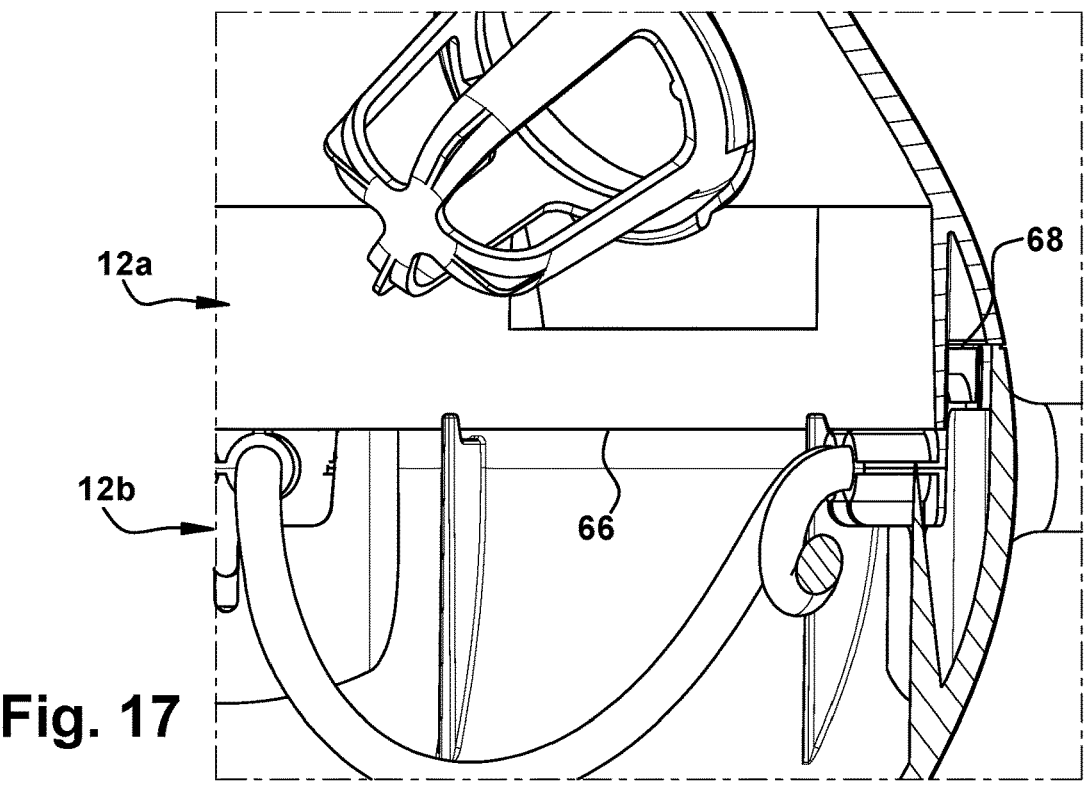
FIG. 17 is an enlarged view of the inter-module connection in FIG. 15.
Figure 18:
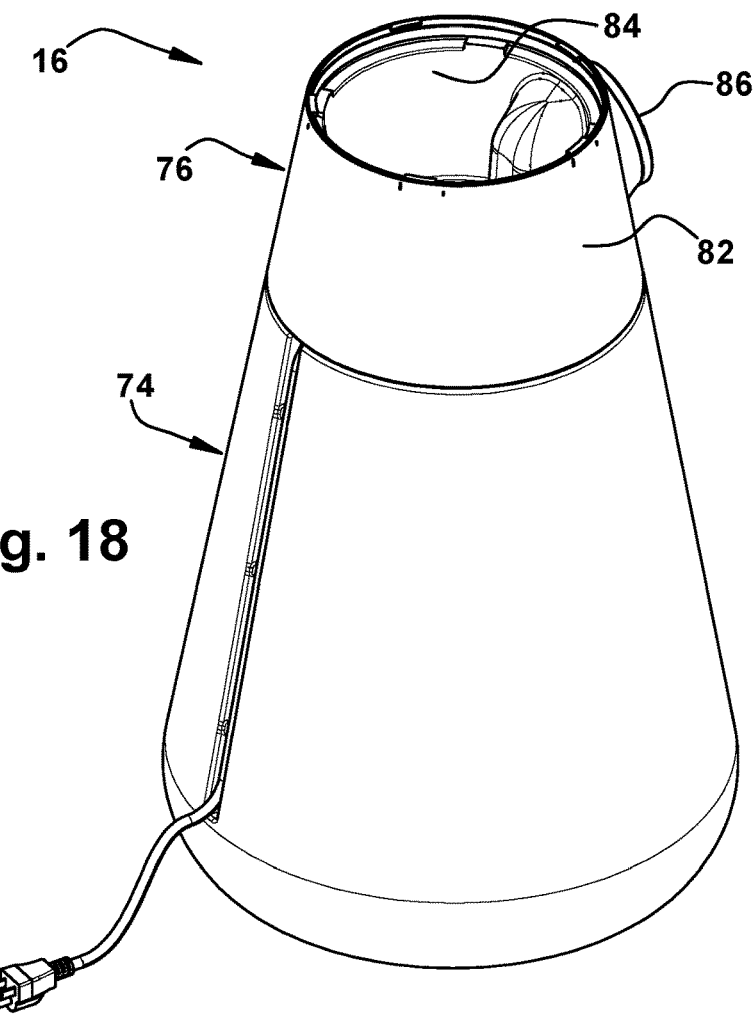
FIG. 18 is a top perspective view of a base of the vertical garden in FIG. 1.
Figure 19:
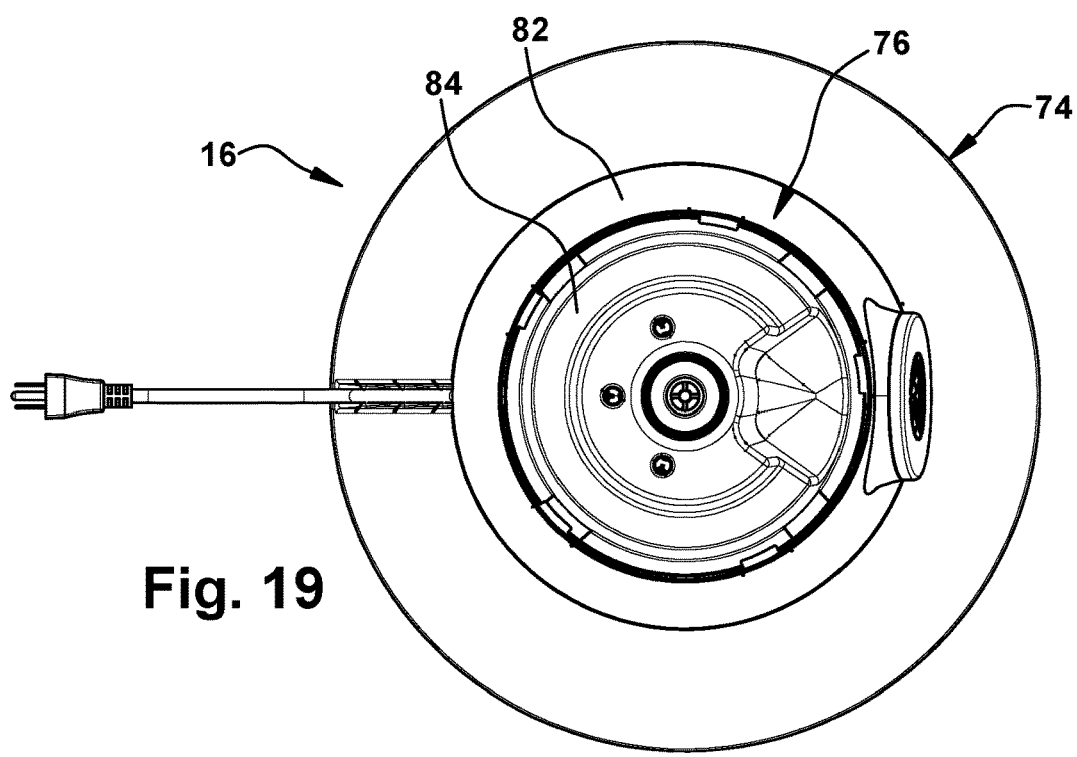
FIG. 19 is a top view of the base in FIG. 18.
Figure 20:
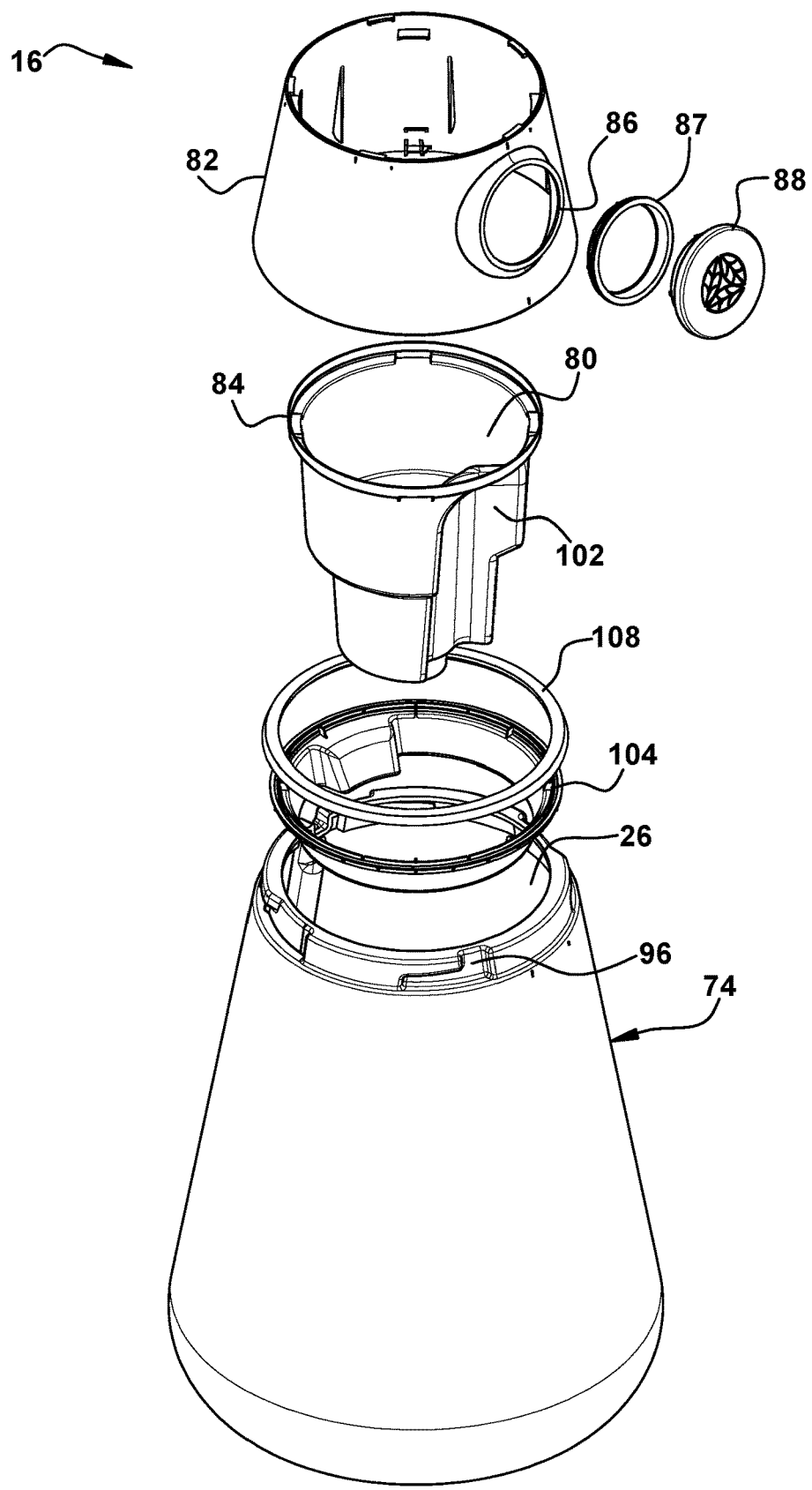
FIG. 20 is an exploded perspective view of the base.

Turning to FIGS. 15-17, the region of the inter-modular connection between adjacent modules (e.g., 12a, 12b) may include liquid diverter(s) or other suitable leakproof features that restrict leakage from the spacing between the adjacent modules 12a, 12b. In the illustrated embodiment, for example, a lower edge 66 of the lower body portion 21a of the above module (e.g., 12a) is located radially inwardly of an upper edge 68 of the upper body portion 21b of the below module (e.g., 12b). The lower edge 66 of the lower body portion 21a of the above module and the upper edge 68 of the upper body portion 21b of the below module also may axially overlap with each other. As shown, the lower edge 66 of the lower body portion of the above module may be formed by an axially extending skirt (also 66) that is radially inward and axially overlapping with an outer wall forming the upper edge 68 of the below module. As shown, the outer surface 20a (or outer wall) of the lower body portion 21a of the above module and the outer surface 20b (or wall) of the upper body portion 21b of the below module may be contoured to meet each other in a continuous manner. The axially extending skirt 66 of the lower body portion of the above module may project axially from the radially outward contour of the outer wall (also 68) of the lower body portion 21a of the above module to provide the radial and axial gapping between the respective lower and upper edges of the modules, as shown.

The intra-module connection interface (e.g., 50, 52) between the upper and lower body portions 21b, 21a within a module 12 also may provide suitable liquid diversion or leak-proof features to restrict leakage from within a module. For example, as shown in FIGS. 15 and 16, the upper body portion 21b of each module may include a ledge 70 having an edge that is radially inward of an upper edge 72 of the lower body portion 21a of the same module (e.g., at the narrow portion of the module). As shown, the ledge 70 of the upper body portion includes an axial wall 71 that axially overlaps with the upper edge 72 of the lower body portion, and which continuous to the floor 40 of the upper body portion 21b. Other suitable means for liquid diversion or leakage prevention may be utilized, such as other overlapping structures, seals, gaskets, or the like. It is also understood that the liquid diversion features of the inter-module connections (e.g., 50, 52) and the intra-module connections (e.g., 46, 48) may be substituted for one another or utilized in conjunction with one another where applicable.

Referring to FIGS. 18-25, the base 16 may include a main base portion 74 and an intermediate portion 76 between the column 14 of planter modules and the main base portion 74. In exemplary embodiments, the intermediate portion 76 may have suitable liquid diversion and/or leakproof features. For example, as shown in the illustrated embodiment, the intermediate portion 76 of the vertical garden may include or constitute an intermediate connector (also 76) between the lowermost planter module 12d and the main base portion 74 that forms the container or tank 26 (also referred to hereinafter as the main base, base container, tank, or container). The intermediate portion 76 interfaces with and interconnects both the lowermost module 12d and the main base portion 74 via respective upper and lower connection interfaces 94, 95 (described below). The intermediate portion 76 includes an internal chamber 80 and is configured to fluidly connect the liquid draining through the planter column 14 back to the tank 26 while restricting leakage at the interconnections. The main base portion 74 which forms the tank 26 may be a blow molded part, whereas the modules 12 may be injection molded, and the intermediate portion 76 may provide a transitionary connection between these different structured parts. The intermediate portion 76 also is configured to provide at least some support functionality to modules 12 above the main base portion 74.

In the illustrated embodiment, the intermediate portion 76 includes an outer intermediate portion 82 (or outer intermediate connector 82) and an inner intermediate portion 84 (or inner intermediate connector 84). The outer intermediate portion 82 may be formed as a collar 82 having an exterior surface that transitions between the outer surface 20a of the lowermost module 12d and the outer surface of the main base portion 74. As shown, the transition of the outer surface of the collar 82 may provide a continuous, radially outwardly tapering transition from the lowermost module 12d to the main base portion 74. The outer collar 82 may include a fill port 86 that is in fluid communication with the tank 26 and used to fill the tank. A suitable gasket 87 may surround the opening of the fill port 86, and a cap 88 may be provided to cover the fill port opening and prevent contamination of the liquid in the tank 26.

Figure 23:
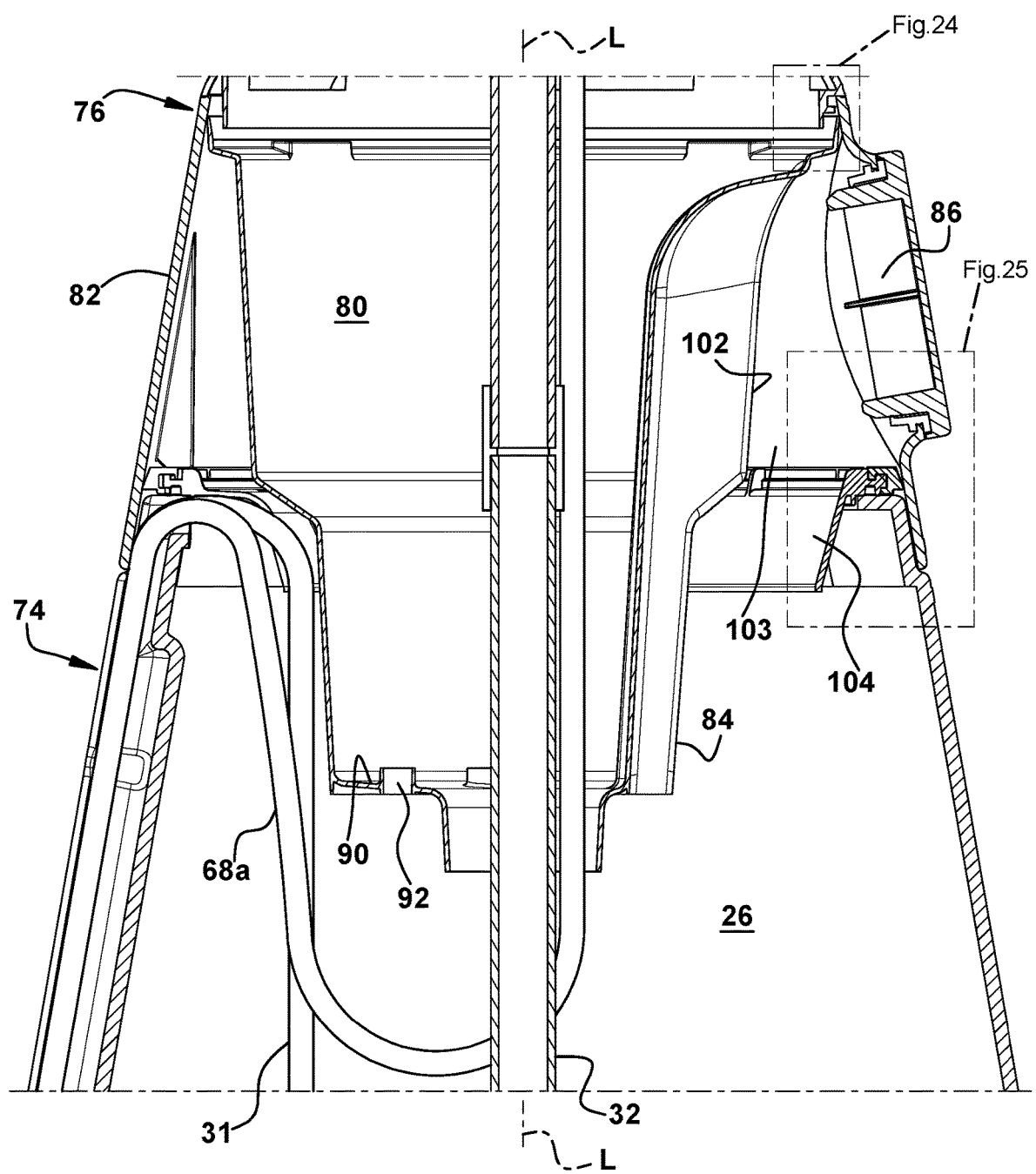
FIG. 23 is an enlarged cross-sectional side view of a portion of the base.

In exemplary embodiments, the inner intermediate portion 84 provides an intermediate basin where drainage liquid can collect before returning to the main reservoir or tank 26 of the main base portion 84. As shown, the inner intermediate portion 84 may be formed as a bucket, basket, vessel or any other suitable receptacle or container for providing the intermediate drainage basin. In exemplary embodiments, the inner intermediate portion 84 forms a diverter or funnel that directs the drainage liquid radially inwardly away from the exterior wall of the main base portion 74 as it drains downwardly. The inner intermediate portion 84 may provide a trap or catch for plant debris. For example, a floor 90 of the vessel forming the inner intermediate portion 84 may be recessed relative to one or more drainage openings 92 in the floor 90 (FIG. 23). Alternatively or additionally, the drainage openings 92 in the floor may include suitable screens or other debris collection means. The floor 90 of the inner intermediate portion 84 also may provide support for the section of conduit 32 extending to/from the pump 28.

Figure 21:
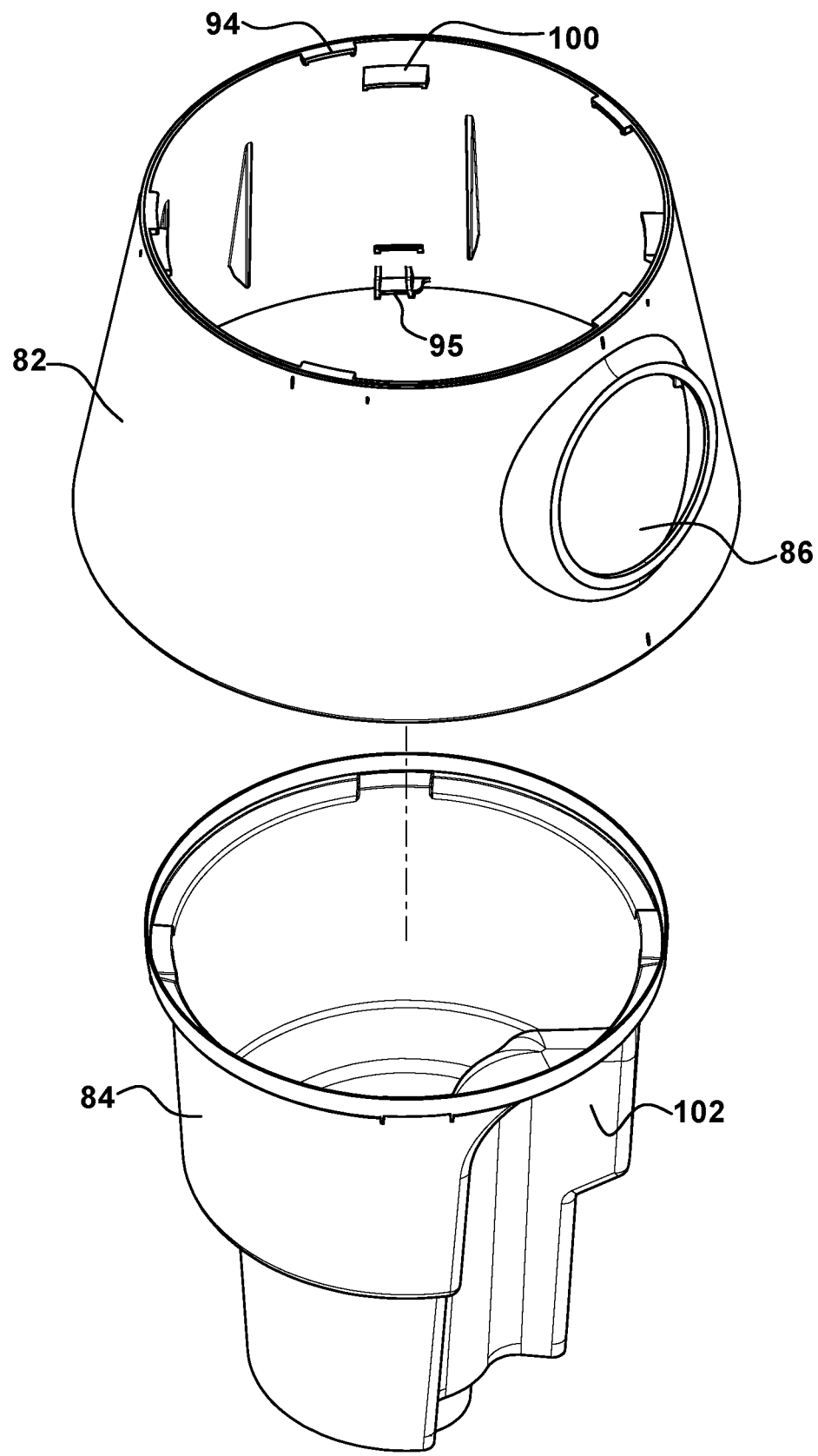
FIG. 21 is an exploded view of an exemplary intermediate portion of the base in FIG. 19.

As best illustrated in FIG. 21, an upper portion of the outer collar 82 may include an upper interlocking interface including one or more interlocking elements 94, which may be the same as the interlocking elements 46 (e.g., lugs) of the upper body portions 21b described above. Such interlocking elements 94 (e.g., lugs) may be adapted for connecting with the complementary interlocking elements 48 (e.g., slots) of the lower body portion 21a. A lower portion of the outer collar 82 may include a lower interlocking interface including one or more interlocking elements 95 for connecting with complementary interlocking elements 96 of the main base portion 74. The interlocking elements 95 of the collar 82 may be lugs, and the interlocking elements 96 of the main base portion 74 may be slots which may include a detent 96a and rotational stop 96b (FIG. 22).

Figure 24:
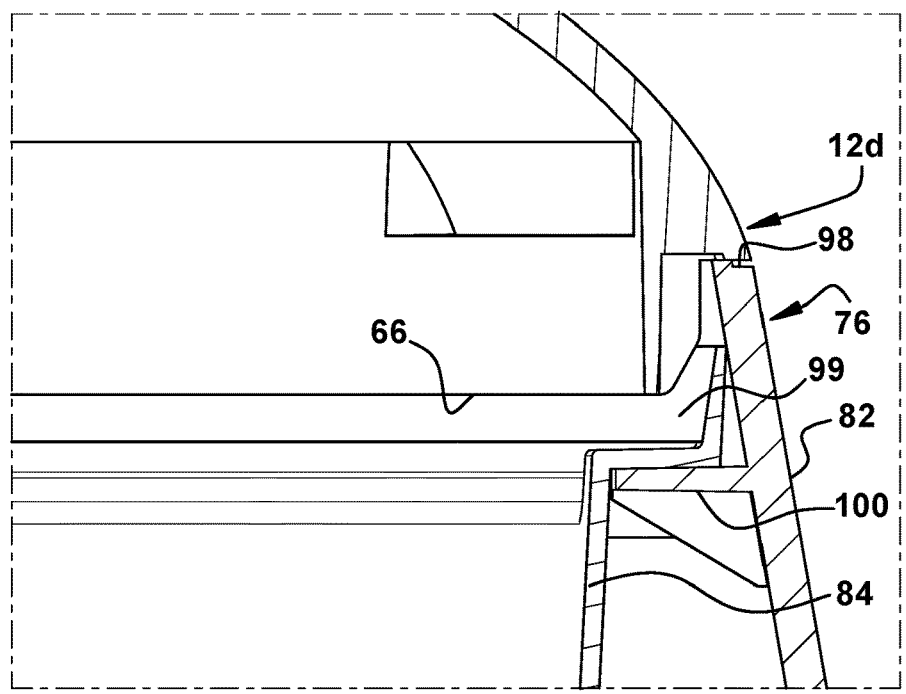
FIG. 24 is an enlarged view of the region 24 in FIG. 23 showing a connection of the intermediate portion with a lowermost module.

As best shown in FIG. 24, to restrict leakage at the interconnection between an upper edge 98 of outer intermediate portion 82 (e.g., collar) and the lower edge 66 (e.g., skirt) of the lower body portion 21a of the lowermost module 12d, the respective edges 98, 66 may be radially and/or axially spaced apart from each other, with the lower edge 66 of the lower body portion (e.g., skirt) being axially lower and radially inward of the upper edge 98 of the collar 82. Also shown in FIG. 24, the inner intermediate portion 84 (e.g., vessel/basket) may include flow diversion and leakproof features, which in the illustrated embodiment is formed as a rim 99 or inner collar that surrounds the longitudinal axis. As shown, the upper edge of the rim 99 is radially outward of the lower edge 66 (e.g., skirt) of the lowermost module 12*d* and is at a higher elevation than the lower edge 66. The inner intermediate portion 84 (e.g., basket) may be supported by the outer intermediate portion 82 (e.g., collar), such as via respective portions of the rim 99 being supported by radially inwardly protruding ledges 100 of the collar 82. In the illustrated embodiment, the inner intermediate portion 84 includes a cupped or recessed portion 102 (see e.g., FIG. 21) that is spaced apart from the fill port 86, and which provides a flow gap 103 (see e.g., FIG. 23) that forms a flow path for filling the tank 26. The outer surface of the inner intermediate portion 84 (e.g., basket) can be seen through the fill port 86 and may provide a visual indicator to determine fill level in the tank 26.

Figure 25:
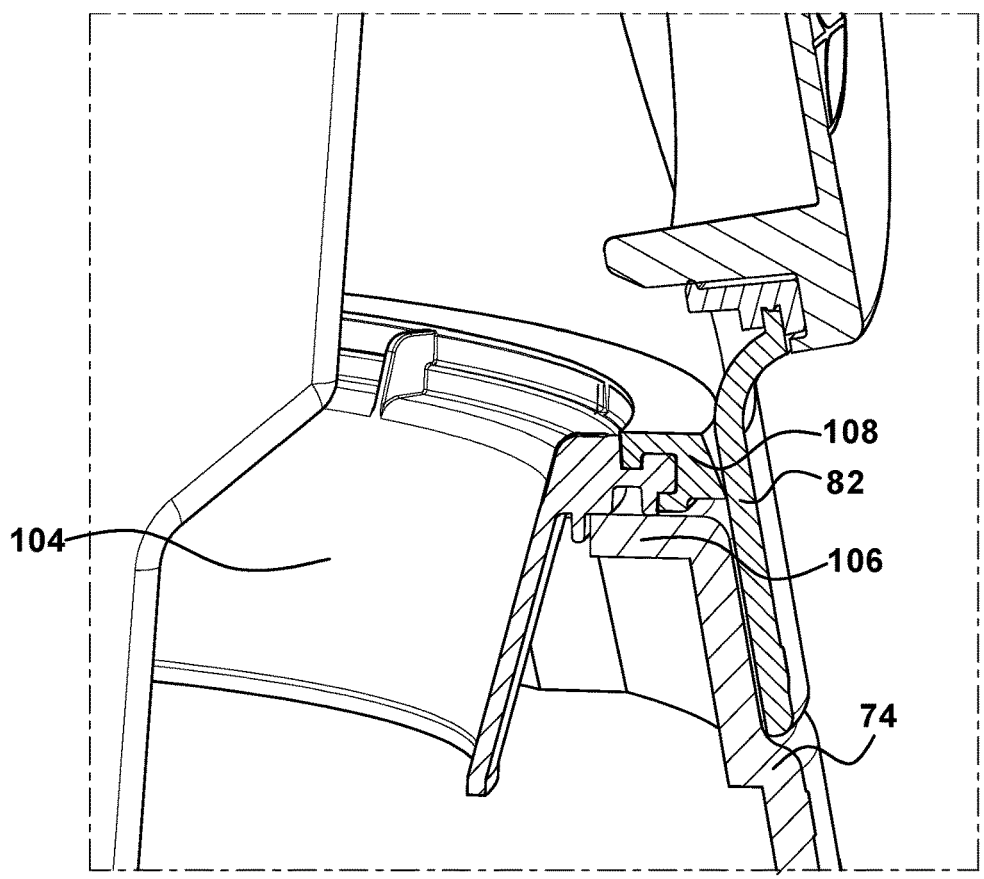
FIG. 25 is an enlarged view of the region 25 in FIG. 23 showing a connection of the intermediate portion with the main base portion.
Figure 26:
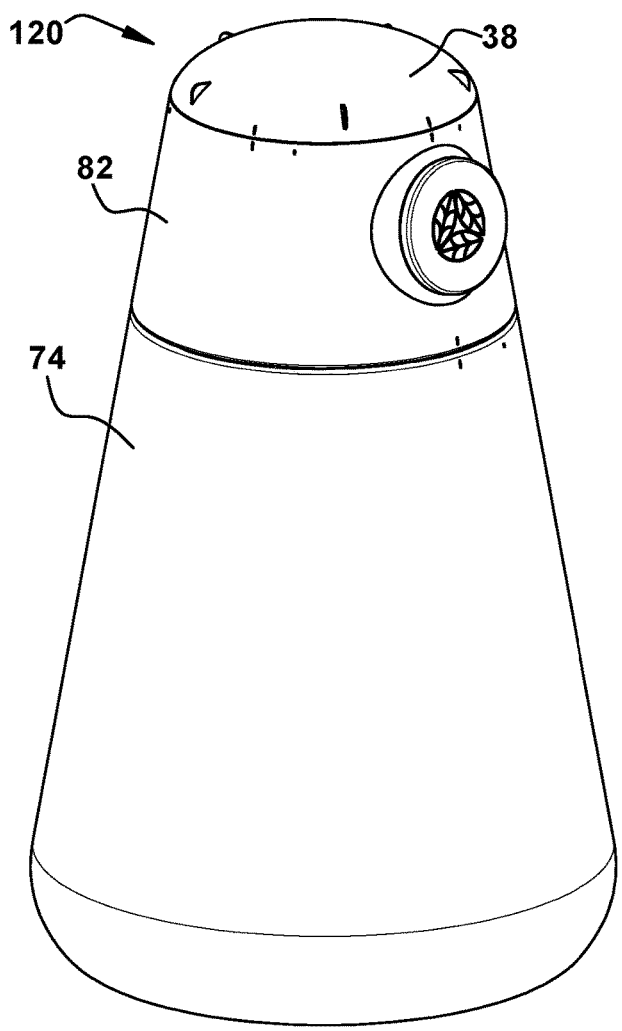
FIG. 26 is a top perspective view of the vertical garden in a disassembled and packaged state which forms a kit.
Figure 27:
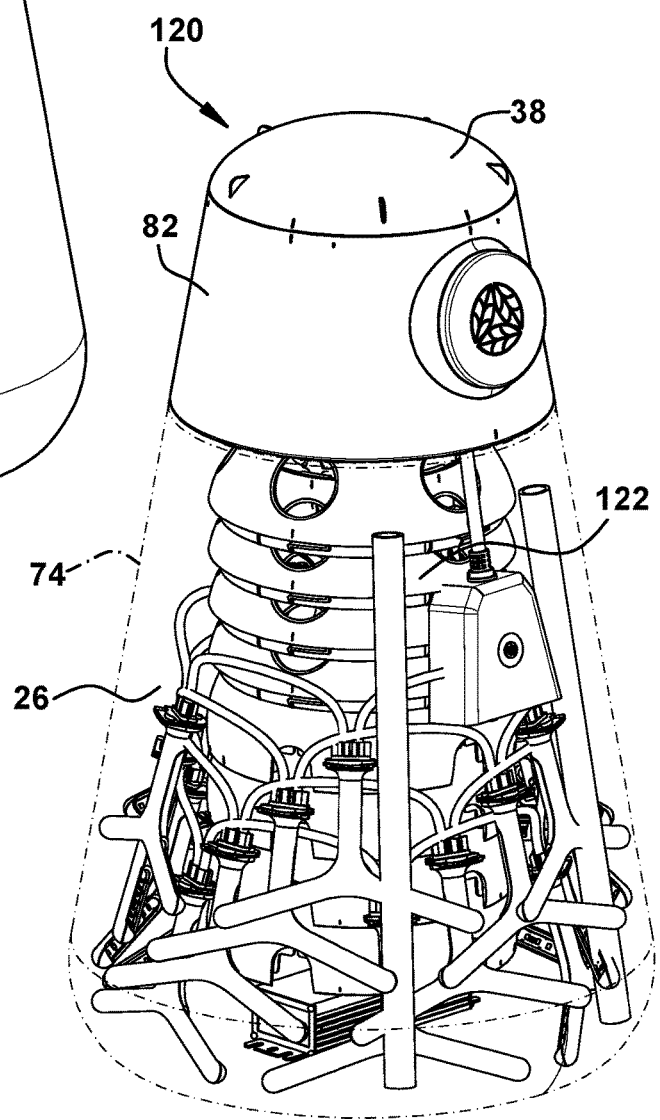
FIG. 27 is a top perspective view of the kit in FIG. 26 with the exterior of the main base portion shown in transparent view.
Figure 28:
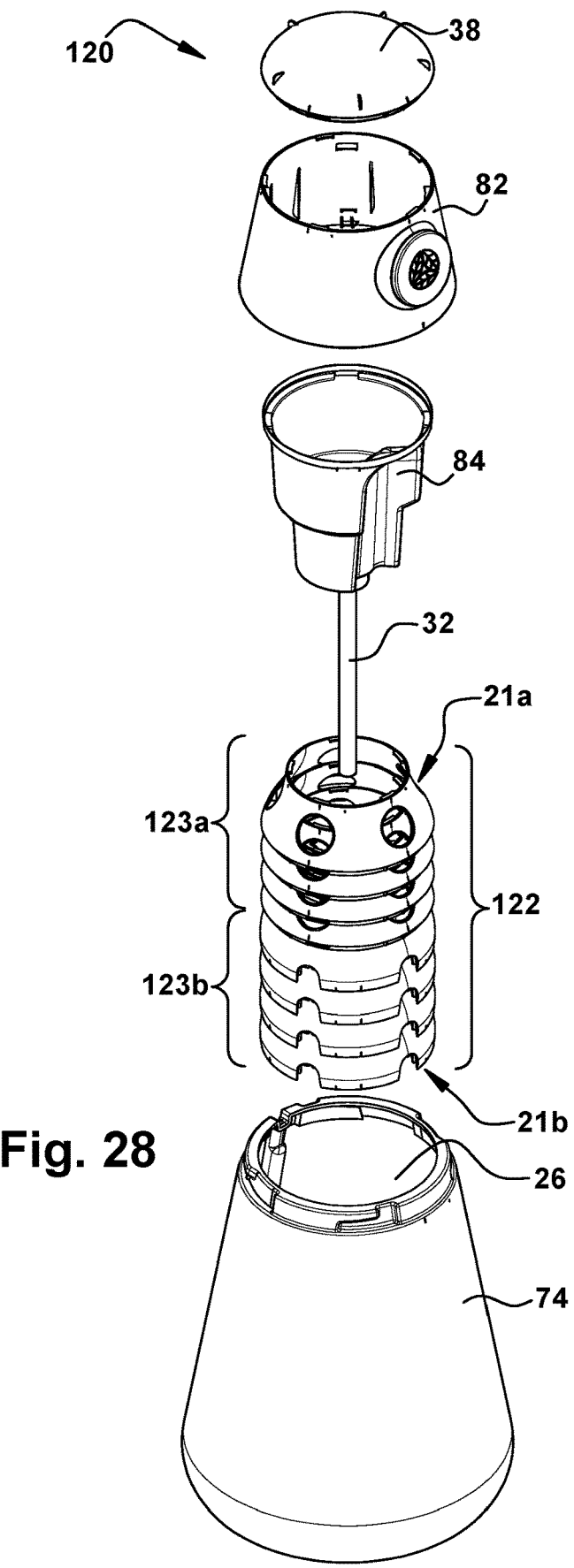
FIG. 28 is an exploded perspective view of the kit in FIG. 26.

To further enhance the leakproof functionality of the design, the assembly of the intermediate portion 76 also may include a flow diverter 104 at the connection between the intermediate portion 76 (e.g., at the outer collar 82) and the main base portion 74. The flow diverter 104 may be in the form of a tapered rim or funnel that surrounds the axis and diverts flow away from the outside. As best shown in FIG. 25, the flow diverter 104 may be supported atop an upper rim 106 or ledge of the main base portion 74 and may include a gasket 108 or other suitable seal that sealingly engages with an inner surface of the outer collar 82. The flow diverter 104 may be secured in place by being sandwiched between a portion of the outer collar 82 and the upper rim 106 of the main base portion 74, such as via one or more radially inwardly protruding lugs 109 (best shown in FIG. 21). The diverter 104 may be placed on the tank prior to installing the intermediate portion 76, or could be pre-assembled to the intermediate portion.

Figure 22:
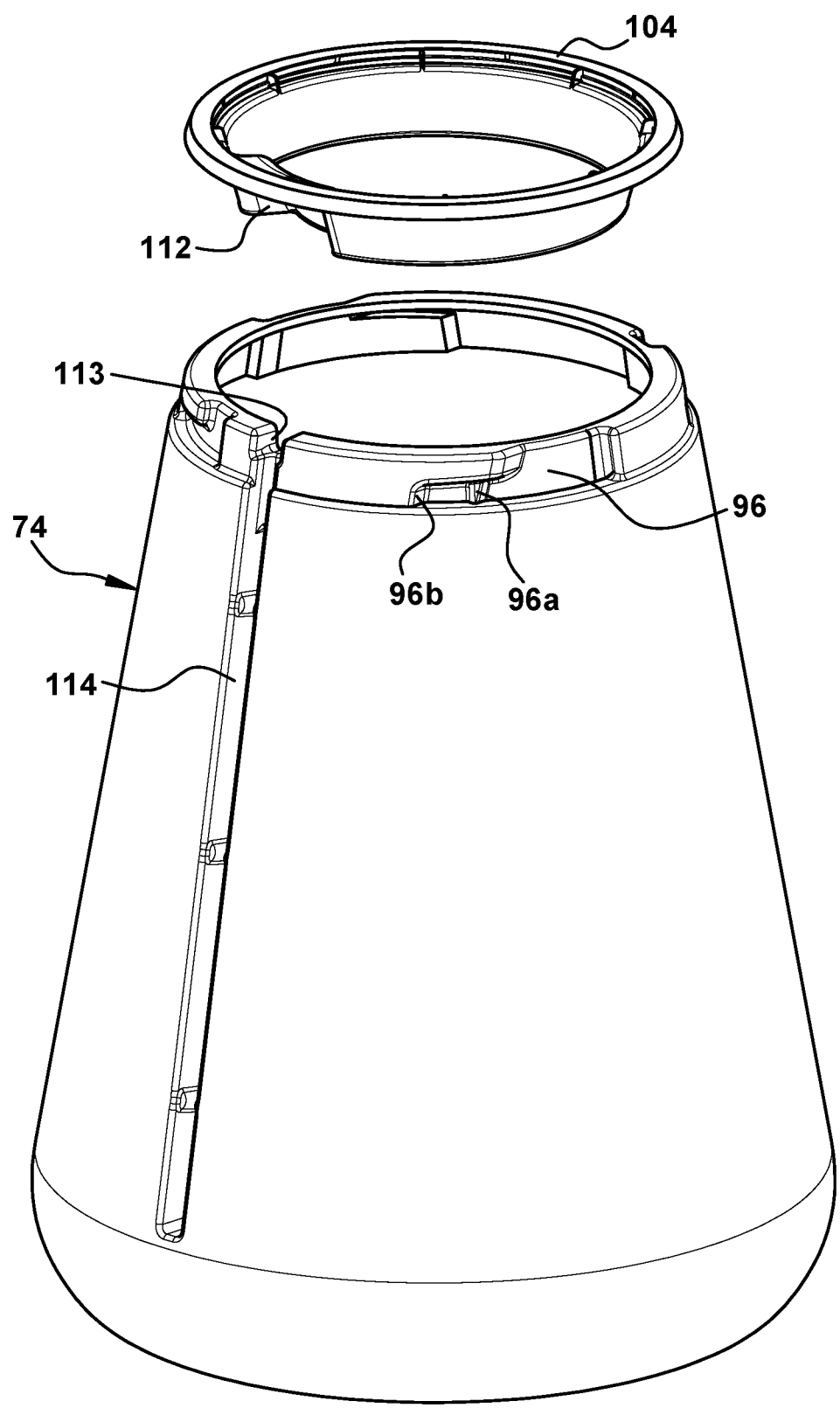
FIG. 22 is an exploded view of main base portion and a diverter.

As best shown in FIGS. 22 and 23, the intermediate portion 76 and the main base portion 74 may cooperate with each other to permit electrical cables 31, 58*a* for the pump 28 and/or lighting 54 to extend from outside to inside the vertical garden 10. In the illustrated embodiment, the diverter 104 includes a recessed portion 112 that aligns with a corresponding recessed portion 113 in the main base portion 74. The wires 3*a*1, 68 extend up a vertical recessed portion 114 in an outer surface of the main base portion 74, and then extend through a gap formed by the recessed portion 112 of the diverter 104. As shown in FIG. 23, this permits the electrical cable 68*a* to have a suitable drip loop configuration before extending up through the central hubs to connect with the assemblies of the light branches 54.

As noted above, the exemplary vertical garden 10 not only provides a suitable structure for the vertical cultivation of plants, but the garden also provides a unique configuration in which the planter modules 12 are nestable within each other to form a compact bundle of nested modules when the garden is in a disassembled state, thereby facilitating packaging and shipping of the garden as a compact kit.

Turning to FIGS. 26-29, the garden 10 is shown in an exemplary disassembled and nested state in the form of a compact kit 120. As described above, each of the planter modules 12 may be segmented such that each module 12 can be coupled via its intra-module interface (e.g., 50, 52) to construct a housing body 21 that can be stacked into the vertical column 14, and can be decoupled at its intra-module interface to deconstruct the housing body 21 to promote nesting into a compact bundler 122. Although shown as being nestable modules 12 via the segmented deconstructable design, it is also understood that the modules 12 could be nestable into the compact bundle 122 without such deconstruction. Moreover, although shown with multiple modules in the kit 120, it is understood that such a compact kit 120 could also include a single module 12, in which case the container would be sized to nest at least the at least one planter module within the container when in a disassembled state.

To promote nestability of the deconstructed modules 12 into the compact bundle 122, the respective segmented body portions 21*a*, 21*b* of each module 12 may have a complementary shape with other respective segmented body portions 21*a*, 21*b* of the other modules. For example, in the illustrated embodiment, the generally frustoconical or hemispherical shape of the upper and lower body portions 21*a*, 21*b* (e.g., segments or halves) of each module 12 may promote such nesting, as exemplified in FIGS. 28 and 29. In the illustrated nested state, the lower body portions 21*a* (e.g., first segments) are nested within corresponding other ones of the lower body portions 21*a* to form a first set 123*a* of nested modules in the compact bundle 122. Likewise, the upper body portions 21*b* (e.g., second segments) are nested within corresponding other ones of the upper body portions 21*b* to form a second set 123*b* of nested modules in the compact bundle 122. In the illustrated embodiment, this is primarily due to the presence of the floor 40 of the upper body portions 21*b*. It is understood, however, that in other embodiments, the lower and upper body portions 21*a*, 21*b* could be intermixed and nested within each other in the compact bundle 122. By virtue of the shape of the body portions 21, 21*b*, the body portions 21*a*, 21*b* may be nested together into the compact bundle 122 (or compact stack) facing in the same direction, as shown. It is understood that the respective upper and lower body portions 21*b*, 21*a* may have other differences in shape that enable nestability.

Generally, the assemblage of the vertical column 14 is such that the nesting of the modules 12 to form the compact bundle 122 in the disassembled and kitted state significantly reduces the overall height (Hb) of the nested bundle 122 (FIGS. 26-29) compared to the overall height (Hc) of the vertical column 14 when in the fully-assembled and stacked state (FIGS. 1-3). In exemplary embodiments, the reduction in height from the overall stacked column height (Hc) to the overall nested bundle height (Hb) is in the range from about 20% to about 80%, more particularly about 20% to about 60%, or even more particularly about 25%-50% reduction in height. For example, in the illustrated embodiment, the overall height (Hc) of the planter column 14 in the stacked and assembled state is 29.25-inches, whereas the overall height (Hb) of the nested bundle 122 when disassembled is about 15.45-inches, resulting in a 48% reduction in height.

Figure 29:
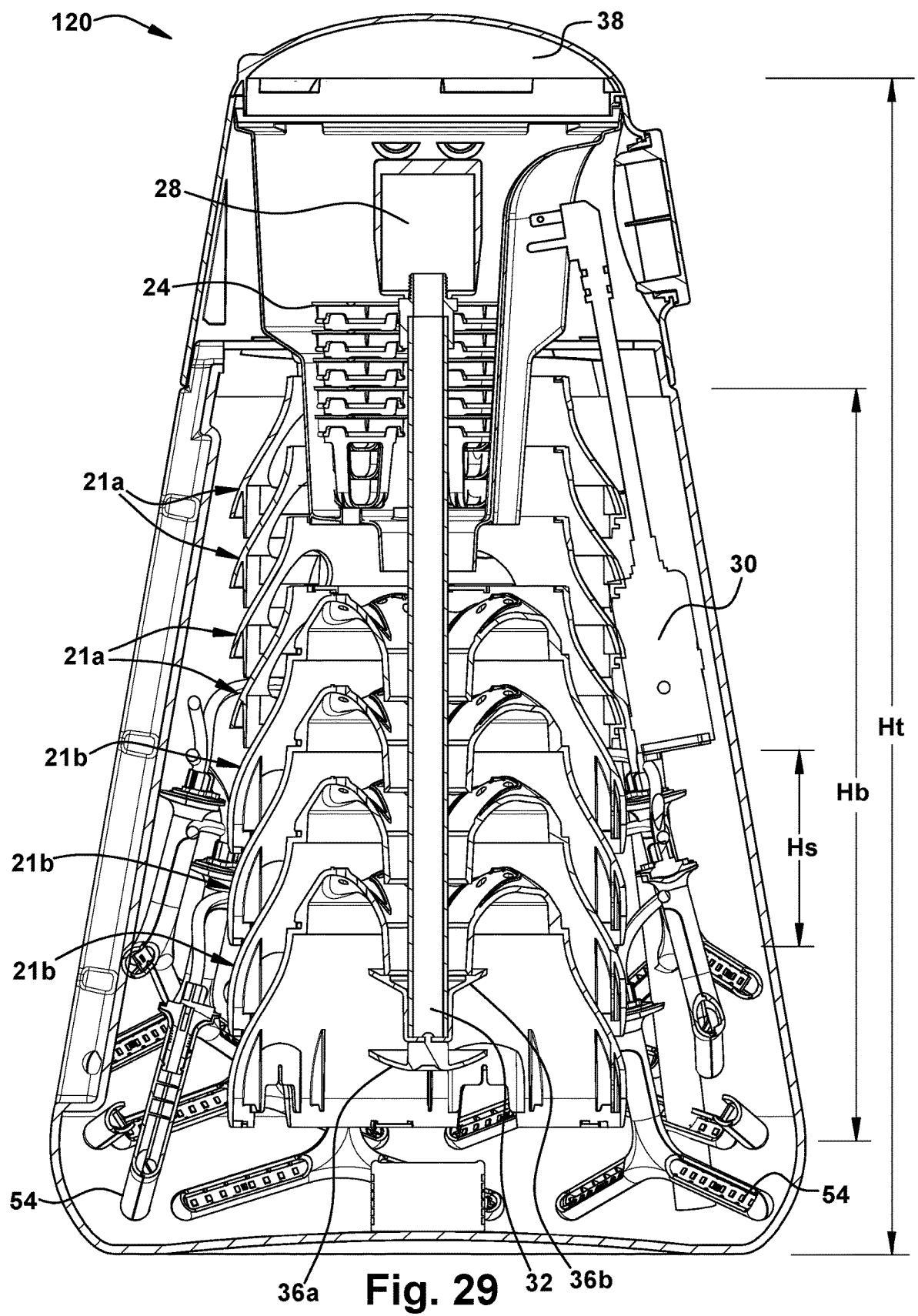
FIG. 29 is a cross-sectional side view of the kit in FIG. 26.

The reduction in height may depend on the particular configuration of the planter modules 12, such as the body portions 21*a*, 21*b* when deconstructed and nested. For example, as best shown in FIG. 29, each body portion 21*a* or 21*b* of the planter module 12 has a height (Hs) from top to bottom, and the body portions 21*a*, 21*b* are nestable within each other such respective above body portions fit over and axially overlap with respective below body portions by an amount that is in a range from 30% to 80% of the height of the below body portion being overlapped, more particularly in a range from 40% to 70%, and even more particularly about 50% of the height (Hs). Again, in the illustration the body portions 21*a*, 21*b* of the deconstructed module housings are nested, although it is understood that fully-constructed module housings could be nested, and thus "nested module" or "nestable module" as used herein refers to either fully constructed or deconstructed modules that can be reconstructed such as via the coupling interface(s). In addition, it is understood that although the planter modules 12 are shown as being segmented into upper and lower halves along a horizontal connection, other suitable partitions of the modules are possible, including vertical, diagonal or irregular partitions. The horizontal partition, however, provides advantages in restricting leakage, and the exemplary partition at the narrow region 21c of the module also provides advantages as described above.

As best shown in FIG. 29, the nested bundle 122 of disassembled modules 12 may fit completely within and be enclosed by an internal chamber formed by the base 16, which enhances the transportability and packaging of the design. In this manner, the base 16, including the main base portion 74 and optionally the intermediate portion 76 is configured to have an overall height (Ht) that is greater than the height (Hb) of the nested bundle 122. The base 16 also includes an opening 124 that is sized such that the nested modules 12 in the bundle 122 can be inserted and removed from the internal chamber of the base 16. As is apparent, because the upper portion of the intermediate portion 76 is adapted to interface with the lowermost module 12d, and thus has a relatively narrow opening, the intermediate portion 76 (including collar 82 and basket 84) may be removed to access a suitably sized opening 124 for inserting or retrieving the nested modules of the bundle 122, and other components which may be stored in the base 16.

The respective upper and lower body portions 21b, 21a may be nested and stacked onto one segment of the conduit 32 (e.g., pipe), as shown. The diffuser(s) 36a, 36b may be used as a stop to secure the body portions 21a, 21b to the conduit 32 so that the entire nested bundle 122 may be removed at once as a unit. It is understood, however, that the bundle 122 of nested modules does not necessarily need to be tied together in any manner, and could instead form a loosely nested stack. As shown, the space remaining space in the internal chamber of the base 16 may be used to contain other items of the assemblage, such as the power source 30, other segments of conduit 32, and the branched lights 54. The modular branched lights 54 in the T- or Y-shaped design with flexible electrical wiring therebetween enables these parts to be placed in the relatively small space. As shown, the basket 84 of the intermediate portion 76 may be used to contain other (e.g., smaller) components of the assemblage, such as the planter cups 24, pump 28, or the like. The narrower bottom portion of the basket 84 is adapted to fit within openings of the set of nested lower body portions 21a, as shown, which further facilitates the compactness of the design. The cap 38 interfaces with the upper interlocking elements 94 of the collar 82 of the intermediate portion 76 to enclose all components in the kit.

An exemplary vertical garden has been described herein. In exemplary embodiments, the vertical garden has an assemblage of parts that facilitates packaging and transportation in a disassembled state and/or one or more features that provide an enhanced leakproof design. The assemblage includes a base and planter modules that are stackable atop the base to form a vertical column of stacked modules for growing plants when in a fully-assembled state. The planter modules may be nestable within each other to form a compact bundle of nested modules that is smaller in size than the vertical column of stacked modules when in a disassembled state, thereby providing a kit that facilitates compact packaging of the vertical garden. An intermediate portion of the garden may have a divider that separates a drain path from the fill port of the device, thereby restricting leakage. A catch basin may be provided for capturing debris. A modular grow lighting system also may be provided.

According to an aspect, a vertical garden assemblage includes: a base forming a container, and at least one planter module that is stackable atop the base to form a vertical column of the vertical garden when in an assembled state, wherein the container is sized to nest at least the at least one planter module within the container when in a disassembled state.

Embodiments may include one or more of the following additional features, separately or in any combination.

In exemplary embodiment(s), all components of the vertical garden assemblage except for the base are configured to fit completely within and be enclosed by the container.

In exemplary embodiment(s), the base includes a collar, the collar being removable to form an opening of the base that is sized to permit insertion of the at least one module into the container of the base.

In exemplary embodiment(s), the collar is at an upper portion of the base, and is configured to interface and support the at least one planter module above the base when the vertical garden is in the assembled state.

In exemplary embodiment(s), the at least one planter module is a plurality of planter modules.

In exemplary embodiment(s), the plurality of planter modules are stackable atop each other to form a vertical column of stacked modules that is at least partially supported by the base and configured to grow one or more plants when the vertical garden is in a fully-assembled state.

In exemplary embodiment(s), the plurality of planter modules are nestable within each other to form a compact bundle of nested modules that is smaller in size than the vertical column of stacked modules to thereby facilitate packaging of the vertical garden when in a disassembled state.

In exemplary embodiment(s), the vertical column of stacked modules has a column height in a vertical direction.

In exemplary embodiment(s), the compact bundle of nested modules has a bundle height in the vertical direction.

In exemplary embodiment(s), the bundle height is in a range from 20% to 80% less than the column height.

In exemplary embodiment(s), the bundle height is in a range from 20% to 60%, more particularly about 50% less than the column height.

In exemplary embodiment(s), each planter module of the plurality of planter modules has a height from top to bottom.

In exemplary embodiment(s), the plurality of planter modules are nestable with each other such that the compact bundle of nested modules includes respective above modules of the plurality of planter modules that fit over and axially overlap with respective below modules of the plurality of planter modules, and each respective above module axially overlaps with each respective below module by an amount that is in a range from 30% to 80% of the height of the respective below module being overlapped.

In exemplary embodiment(s), each respective above module axially overlaps with each respective below module by an amount that is in a range from 20% to 80%, more particularly about 50% of the height.

In exemplary embodiment(s), the base provides a container, and the compact bundle of nested modules is configured to fit completely within and be enclosed by the container.

In exemplary embodiment(s), the base provides a tank for containing feed liquid to be distributed to the one or more plants.

In exemplary embodiment(s), the base further provides an intermediate portion that is configured to be disposed between the vertical column of stacked modules and the tank when the vertical garden is in the fully-assembled state.

In exemplary embodiment(s), the tank and intermediate portion provide an overall height of the base, and the compact bundle of nested modules has a height that is less than the overall height of the base such that the compact bundle can completely be enclosed by an interior of the base.

In exemplary embodiment(s), the intermediate portion is removable from the tank to permit insertion of the compact bundle into the base, and is couplable to the tank to permit at least partially enclosing the compact bundle to the base.

In exemplary embodiment(s), each planter module of the plurality of planter modules has a segmented body including a first segment and a second segment.

In exemplary embodiment(s), when in the fully-assembled state, the first segment and the second segment of each planter module are coupled together to construct a housing configured to be stacked into the vertical column for growing the one or more plants.

In exemplary embodiment(s), when in the disassembled state, the first segment and the second segment of each planter module are decoupled from each other to deconstruct the housing and permit nesting of the first and/or second segments of the respective planter modules within each other, or within corresponding other ones of the first and/or second segments, to provide the compact bundle of nested modules.

In exemplary embodiment(s), the first and second segments are (i) nested within each other in the compact bundle, or (ii) the first segments are nested within corresponding other ones of the first segments in the compact bundle and the second segments are nested within corresponding other ones of the second segments in the compact bundle.

In exemplary embodiment(s), the first and second segments have respective connectors that are configured to couple together the first and second segments to construct the housing when in the fully-assembled state.

In exemplary embodiment(s), when in the disassembled state, the first and second segments of the each of the plurality of planter modules are decoupled from each other at the respective connectors to deconstruct the respective housings, and are nestable in the compact bundle with the respective connectors of the respective first segments facing in the same direction and/or with the respective connectors of the respective second segments facing in the same direction.

In exemplary embodiment(s), the respective first segments of the plurality of planter modules are nested together in the compact bundle in a first set, and the respective second segments of the plurality of planter modules are nested together in the compact bundle in a second set.

In exemplary embodiment(s), when in the fully-assembled state: the first segment of each of the plurality of planter modules forms a lower body part of the housing, the lower body part having one or more openings into an internal chamber of the housing, the one or more openings being configured to support the one or more plants.

In exemplary embodiment(s), when in the fully-assembled state: the second segment of each of the plurality of planter modules forms an upper body part of the housing, wherein the upper body part includes one or more liquid flow passages that form an internal flow path to the internal chamber and are configured to distribute feed liquid to the one or more plants supported in the one or more openings.

In exemplary embodiment(s), the upper and lower body parts each have a radially enlarged portion and a radially narrowed portion, the upper and lower body parts each having respective connectors at the respective radially narrowed portions, the respective connectors being configured to couple together the upper and lower body parts to construct the housing of the planter module when in the fully-assembled state.

In exemplary embodiment(s), each of the upper and lower body parts have a frustoconical or hemispherical shape.

In exemplary embodiment(s), when in the fully-assembled state: the first and second segments of the respective planter modules have respective intra-module interlocking connectors that interlock the first and second segments to construct the housing.

In exemplary embodiment(s), when in the fully-assembled state: the respective plurality of planter modules further include an upper interlocking connector that interlocks with an above planter module or cap of the vertical garden, and a lower interlocking connector that interlocks with a below planter module, intermediate portion or base of the vertical garden.

In exemplary embodiment(s), when in the fully-assembled state: a force to unlock the respective intra-module interlocking connectors to decouple the first and second segments is greater than a force to unlock the upper and lower interlocking In exemplary embodiment(s), the base provides a tank for containing a liquid; the vertical column provides at least one drainage passage configured to pass drainage liquid downwardly through the planter column toward the base, the at least one drainage passage being fluidly connected to the tank for passing the drainage liquid from the vertical column to the tank.

In exemplary embodiment(s), a fill port is provided fluidly connected to the tank for filling the tank with liquid; and a divider is provided that is configured to fluidly separate the drainage liquid from the fill port to thereby restrict leakage of the drainage liquid outwardly through the fill port.

In exemplary embodiment(s), a catch basin is provided at an intermediate portion of the vertical garden between the vertical column and the tank, the catch basin being configured to receive drainage liquid from the vertical column, catch debris in the drainage liquid, and pass the drainage liquid to the tank.

In exemplary embodiment(s), the catch basin forms at least part of the divider.

In exemplary embodiment(s), the vertical garden assemblage further includes: a lighting arrangement comprising a plurality of lights mounted to the vertical column in a laterally and/or longitudinally spaced array.

In exemplary embodiment(s), each of the plurality of lights includes a post operatively mounted to and radiating from the vertical column, and a plurality of branches extending outwardly from the post.

In exemplary embodiment(s), the branches extend from the post in a Y-shape or T-shape configuration.

According to another aspect, a vertical garden assembly includes: the assemblage according to any of the preceding, in the stacked and fully-assembled state; wherein: the base provides a tank for storing feed liquid, the tank contains a pump, and a fluid conduit extends upright from the pump through the plurality of planter modules to pump the feed liquid from the pump to an upper one of the planter modules via the fluid conduit, and each of the planter modules includes (i) a lower body part having one or more openings that open toward an internal chamber of the planter module, in which the one or more openings are configured to support the one or more plants, and (ii) an upper body part having one or more liquid flow passages that form a drainage path through the vertical column from the upper one of the planter modules to the tank, the one or more liquid flow passages of the upper body part being configured to distribute feed liquid to the one or more plants supported in the one or more openings.

According to an aspect, a kit for a vertical garden, includes: the assemblage according to any of the preceding, in the disassembled state; wherein the at least one planter module is nested within and completely enclosed within the container.

In exemplary embodiment(s) of the kit, the at least one planter module is a plurality of planter modules, and each planter module of the plurality of planter modules has a segmented body including a first segment and a second segment, the first and second segments of each planter module are decoupled from each other and are (i) nested within each other in the compact bundle, or (ii) the first segments are nested within corresponding other ones of the first segments in the compact bundle and the second segments are nested within corresponding other ones of the second segments in the compact bundle; and the compact bundle of nested modules is completely enclosed within the container.

According to an aspect, a method of assembling a kit for a vertical garden, includes: providing the assemblage according to any of the preceding; nesting the plurality of modules together either in a constructed state or a deconstructed state to form the compact bundle of nested modules; packaging the compact bundle of nested modules into the container, in which the container at least partially forms a tank for containing liquid for the vertical garden, the packaging being such that the compact bundle of nested modules is inserted through an opening in the container and the container completely encloses the compact bundle of nested modules; and assembling a cap to the container to close the opening of the container.

According to an aspect, a vertical garden, includes: a base with a tank for containing a liquid; a planter column supported above the base for growing one or more plants, the planter column having at least one drainage flow path configured to pass drainage liquid downwardly through the planter column toward the base, the at least one drainage flow path being fluidly connected to the tank for passing the drainage liquid from the planter column to the tank; a fill port fluidly connected to the tank for filling the tank with liquid; and a divider configured to fluidly separate the drainage liquid from the fill port to thereby restrict leakage of the drainage liquid outwardly through the fill port.

Embodiments may include one or more of the following additional features, or one or more of the foregoing additional features, separately or in any combination.

In exemplary embodiment(s), the tank contains a pump for pumping feed liquid, and a fluid conduit extends upright from the pump through the planter column for passing the feed liquid upwardly to an upper portion of the column, whereby the feed liquid becomes drainage liquid that drains through the planter column for feeding plants.

In exemplary embodiment(s), the fluid conduit separates the feed liquid passing upwardly from the drainage liquid passing downwardly, and separates the feed liquid from the fill port.

In exemplary embodiment(s), the vertical garden further includes an intermediate portion between the base and the planter column, the intermediate portion including an inner intermediate part and an outer intermediate part, wherein: the inner intermediate part at least partially forms an intermediate drainage flow path that fluidly connects the at least one drainage path of the planter column with the tank, the outer intermediate part includes the fill port and at least partially forms a fill flow path that fluidly connects the fill port with the tank, and the inner part forms at least a portion of the divider.

In exemplary embodiment(s), the inner part of the intermediate portion forms a catch basin between the planter column and the tank, the catch basin being configured to receive the drainage liquid from the planter column, catch debris in the drainage liquid, and pass the drainage liquid to the tank.

According to another aspect, a vertical garden, includes: a base with a tank for containing a liquid; a planter column supported above the base for growing one or more plants, the planter column having at least one drainage passage configured to pass drainage liquid downwardly through the planter column toward the base; and a catch basin at an intermediate portion of the vertical garden between the planter column and the tank, the catch basin being configured to receive drainage liquid from the planter column, catch debris in the drainage liquid, and pass the drainage liquid to the tank.

According to another aspect, a vertical garden assemblage, includes: a base; and a plurality of planter modules; wherein the plurality of planter modules are stackable atop each other to form a vertical column of stacked modules that is at least partially supported by the base and configured to grow one or more plants when the vertical garden is in a fully-assembled state; and wherein the plurality of planter modules are nestable within each other to form a compact bundle of nested modules that is smaller in size than the vertical column of stacked modules to thereby facilitate packaging of the vertical garden when in a disassembled state.

According to another aspect, a vertical garden includes: a base; a vertical planter column supported above the base for supporting and growing one or more plants; and a lighting assembly mounted to the vertical planter column; wherein the lighting assembly includes a plurality of light posts operatively mounted to and radiating from the vertical planter column, and a lighting arrangement including a plurality of lights is provided on each light post, and wherein the respective lighting arrangements on adjacent light posts are discontinuous from each other and spaced apart from each other at least in a circumferential direction around the vertical planter column, thereby facilitating plant growth and/or access to plants between the adjacent light posts and corresponding lighting arrangements.

Embodiments may include one or more of the following additional features, or one or more of the foregoing additional features, separately or in any combination.

In exemplary embodiment(s), each lighting arrangement of the respective light posts includes a plurality of branches extending outwardly from the post; wherein the branches extend from the post in a Y-shape, T-shape, or ring shape configuration.

In exemplary embodiment(s), the plurality of lights are modularly mounted to the vertical planter column via recessed slots that do not increase the height of the vertical planter column when mounted.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operative connection or coupling may include the entities being integral and unitary with each other.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "carrying," "having," "providing," "containing," "involving," "holding," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A vertical garden assemblage, comprising
 a base forming a container, and a plurality of planter modules that are stackable atop the base to form a vertical column of the vertical garden when in an assembled state, wherein the container is sized to nest at least the at least one planter module within the container when in a disassembled state;
 wherein the plurality of planter modules are stackable atop each other to form a vertical column of stacked modules that is at least partially supported by the base and configured to grow one or more plants when the vertical garden is in a fully-assembled state;
 wherein the plurality of planter modules are nestable within each other to form a compact bundle of nested modules that is smaller in size than the vertical column of stacked modules to thereby facilitate packaging of the vertical garden when in a disassembled state;
 wherein each planter module of the plurality of planter modules has a segmented body including a first segment and a second segment,
 wherein when in the fully-assembled state, the first segment and the second segment of each planter module are coupled together to construct a housing configured to be stacked into the vertical column for growing the one or more plants,
 wherein when in the disassembled state, the first segment and the second segment of each planter module are decoupled from each other to deconstruct the housing and permit nesting of the first and second segments of the planter modules within each other, to provide the compact bundle of nested modules;
 wherein when in the fully-assembled state:
  the first segment of each of the plurality of planter modules forms a lower body part of the housing, the lower body part having one or more openings into an internal chamber of the housing, the one or more openings being configured to support the one or more plants; and
  the second segment of each of the plurality of planter modules forms an upper body part of the housing, wherein the upper body part includes one or more liquid flow passages that form an internal flow path to the internal chamber and are configured to distribute feed liquid to the one or more plants supported in the one or more openings; and
 wherein the upper and lower body parts each have a radially enlarged portion and a radially narrowed portion, the upper and lower body parts each having respective connectors at the respective radially narrowed portions, the respective connectors being configured to couple together the upper and lower body parts to construct the housing of the planter module when in the fully-assembled state.

2. The vertical garden assemblage according to claim 1, wherein all components of the vertical garden assemblage except for the base are configured to fit completely within and be enclosed by the container.

3. The vertical garden assemblage according to claim 1, wherein the base includes a collar, the collar being removable to form an opening of the base that is sized to permit insertion of the at least one module into the container of the base.

4. The vertical garden assemblage according to claim 3, wherein the collar is at an upper portion of the base, and is configured to interface and support the plurality of plantar modules above the base when the vertical garden is in the assembled state.

5. The vertical garden assemblage according to claim 1, wherein the vertical column of stacked modules has a column height in a vertical direction;
wherein the compact bundle of nested modules has a bundle height in the vertical direction; and
wherein the bundle height is in a range from 20% to 80% less than the column height.

6. The vertical garden assemblage according to claim 1, wherein each planter module of the plurality of planter modules has a height from top to bottom; and
wherein the plurality of planter modules are nestable with each other such that the compact bundle of nested modules includes respective above modules of the plurality of planter modules that fit over and axially overlap with respective below modules of the plurality of planter modules, and each respective above module axially overlaps with each respective below module by an amount that is in a range from 30% to 80% of the height of the respective below module being overlapped.

7. The vertical garden assemblage according to claim 1, wherein the base provides a container, and the compact bundle of nested modules is configured to fit completely within and be enclosed by the container.

8. The vertical garden assemblage according to claim 1, wherein the base provides a tank for containing feed liquid to be distributed to the one or more plants,
wherein the base further provides an intermediate portion that is configured to be disposed between the vertical column of stacked modules and the tank when the vertical garden is in the fully-assembled state,
wherein the tank and intermediate portion provide an overall height of the base, and the compact bundle of nested modules has a height that is less than the overall height of the base such that the compact bundle can completely be enclosed by an interior of the base, and
wherein the intermediate portion is removable from the tank to permit insertion of the compact bundle into the base, and is couplable to the tank to permit at least partially enclosing the compact bundle to the base.

9. The vertical garden assemblage according to claim 1, wherein the first and second segments have respective connectors that are configured to couple together the first and second segments to construct the housing when in the fully-assembled state; and
wherein when in the disassembled state, the first and second segments of the each of the plurality of planter modules are decoupled from each other at the respective connectors to deconstruct the respective housings, and are nestable in the compact bundle with the respective connectors of the respective first segments facing in the same direction and with the respective connectors of the respective second segments facing in the same direction.

10. The vertical garden assemblage according to claim 1, wherein the base provides a tank for containing a liquid; the vertical column provides at least one drainage passage configured to pass drainage liquid downwardly through the planter column toward the base, the at least one drainage passage being fluidly connected to the tank for passing the drainage liquid from the vertical column to the tank; and wherein:
(i) a fill port is provided fluidly connected to the tank for filling the tank with liquid; and a divider is provided that is configured to fluidly separate the drainage liquid from the fill port to thereby restrict leakage of the drainage liquid outwardly through the fill port; and/or
(ii) a catch basin is provided at an intermediate portion of the vertical garden between the vertical column and the tank, the catch basin being configured to receive drainage liquid from the vertical column, catch debris in the drainage liquid, and pass the drainage liquid to the tank.

11. A vertical garden assembly, comprising:
the assemblage according to claim 1, in the stacked and fully-assembled state; wherein:
the base provides a tank for storing feed liquid, the tank contains a pump, and a fluid conduit extends upright from the pump through the plurality of planter modules to pump the feed liquid from the pump to an upper one of the planter modules via the fluid conduit, and
each of the planter modules includes (i) a lower body part having one or more openings that open toward an internal chamber of the planter module, in which the one or more openings are configured to support the one or more plants, and (ii) an upper body part having one or more liquid flow passages that form a drainage path through the vertical column from the upper one of the planter modules to the tank, the one or more liquid flow passages of the upper body part being configured to distribute feed liquid to the one or more plants supported in the one or more openings.

12. A kit for a vertical garden, comprising:
the assemblage according to claim 1, in the disassembled state; wherein the plurality of plantar modules are nested within and completely enclosed within the container.

13. The kit according to claim 12,
wherein each planter module of the plurality of planter modules has a segmented body including a first segment and a second segment, the first and second segments of each planter module are decoupled from each other and are (i) nested within each other in the compact bundle, or (ii) the first segments are nested within corresponding other ones of the first segments in the compact bundle and the second segments are nested within corresponding other ones of the second segments in the compact bundle; and
the compact bundle of nested modules is completely enclosed within the container.

14. A method of assembling a kit for a vertical garden, comprising:
providing the assemblage according to claim 1;
nesting the plurality of modules together either in a constructed state or a deconstructed state to form the compact bundle of nested modules;
packaging the compact bundle of nested modules into the container, in which the container at least partially forms a tank for containing liquid for the vertical garden, the packaging being such that the compact bundle of nested modules is inserted through an opening in the container and the container completely encloses the compact bundle of nested modules; and
assembling a cap to the container to close the opening of the container.

15. The vertical garden assemblage according to claim 1, wherein, when in the fully-assembled state, for each of the planter modules, the first segment and the second segment are coupled together along a circular interface at an outer surface of the housing.

16. The vertical garden assemblage according to claim 1, wherein the one or more openings are one or more circular openings in an outer surface of the lower body part.

17. The vertical garden assemblage according to claim 1, wherein the one or more liquid flow passages are in a floor of the upper body part.

18. The vertical garden assemblage according to claim 17, wherein the floor is sloped or contoured to direct liquid toward the one or more liquid flow passages.

19. The vertical garden assemblage according to claim 17, wherein the one or more liquid flow passages include multiple liquid flow passages in respective lower regions of the floor that are between circumferentially spaced-apart raised regions of the floor.

20. The vertical garden assemblage according to claim 1, wherein each of the upper and lower body parts have a frustoconical or hemispherical shape.

21. A vertical garden assemblage, comprising
   a base forming a container, and a plurality of planter modules that are stackable atop the base to form a vertical column of the vertical garden when in an assembled state, wherein the container is sized to nest at least the at least one planter module within the container when in a disassembled state;
   wherein the plurality of planter modules are stackable atop each other to form a vertical column of stacked modules that is at least partially supported by the base and configured to grow one or more plants when the vertical garden is in a fully-assembled state;
   wherein the plurality of planter modules are nestable within each other to form a compact bundle of nested modules that is smaller in size than the vertical column of stacked modules to thereby facilitate packaging of the vertical garden when in a disassembled state;
   wherein each planter module of the plurality of planter modules has a segmented body including a first segment and a second segment,
   wherein when in the fully-assembled state, the first segment and the second segment of each planter module are coupled together to construct a housing configured to be stacked into the vertical column for growing the one or more plants,
   wherein when in the disassembled state, the first segment and the second segment of each planter module are decoupled from each other to deconstruct the housing and permit nesting of the first and second segments of the planter modules within each other, to provide the compact bundle of nested modules; and
   wherein when in the fully-assembled state:
      the first and second segments of the respective planter modules have respective intra-module interlocking connectors that interlock the first and second segments to construct the housing; and
      the respective plurality of planter modules further include an upper interlocking connector that interlocks with an above planter module or cap of the vertical garden, and a lower interlocking connector that interlocks with a below planter module, intermediate portion or base of the vertical garden; and
      a force to unlock the respective intra-module interlocking connectors to decouple the first and second segments is greater than a force to unlock the upper and lower interlocking connectors to decouple the respective planter modules from the vertical garden.

22. The vertical garden assemblage according to claim 21, wherein when in the fully-assembled state:
   the first segment of each of the plurality of planter modules forms a lower body part of the housing, the lower body part having one or more openings into an internal chamber of the housing, the one or more openings being configured to support the one or more plants; and
   the second segment of each of the plurality of planter modules forms an upper body part of the housing, wherein the upper body part includes one or more liquid flow passages that form an internal flow path to the internal chamber and are configured to distribute feed liquid to the one or more plants supported in the one or more openings.

23. A vertical garden assemblage, comprising
   a base forming a container, and a plurality of planter modules that are stackable atop the base to form a vertical column of the vertical garden when in an assembled state, wherein the container is sized to nest at least the at least one planter module within the container when in a disassembled state;
   wherein the plurality of planter modules are stackable atop each other to form a vertical column of stacked modules that is at least partially supported by the base and configured to grow one or more plants when the vertical garden is in a fully-assembled state; and
   wherein the plurality of planter modules are nestable within each other to form a compact bundle of nested modules that is smaller in size than the vertical column of stacked modules to thereby facilitate packaging of the vertical garden when in a disassembled state;
   further comprising a lighting arrangement comprising a plurality of lights mounted to the vertical column of stacked planter modules in a circumferentially and vertically spaced array;
   wherein each of the plurality of lights includes a post operatively mounted to and radiating from the vertical column of stacked planter modules, and a plurality of branches extending outwardly from the post.

24. The vertical garden assemblage according to claim 23, wherein each planter module of the plurality of planter modules has a segmented body including a first segment and a second segment,
   wherein when in the fully-assembled state, the first segment and the second segment of each planter module are coupled together to construct a housing configured to be stacked into the vertical column for growing the one or more plants, and
   wherein when in the disassembled state, the first segment and the second segment of each planter module are decoupled from each other to deconstruct the housing and permit nesting of the first and second segments of the planter modules within each other, to provide the compact bundle of nested modules.

25. The vertical garden assemblage according to claim 23, wherein the branches extend from the post in a Y-shape configuration.

26. The vertical garden assemblage according to claim 23, wherein the branches extend from the post in a T-shape configuration.

* * * * *